US011241670B2

(12) United States Patent
Li et al.

(10) Patent No.: US 11,241,670 B2
(45) Date of Patent: Feb. 8, 2022

(54) SYNTHESIS OF A THIN INSOLUBLE HYDROXIDE SHELL ON THE SURFACE OF MAGNETIC ZERO-VALENT METAL NANOPARTICLES FOR ENVIRONMENTAL REMEDIATION

(71) Applicant: THE UNIVERSITY OF HONG KONG, Hong Kong (CN)

(72) Inventors: Xiao Yan Li, Hong Kong (CN); Yi Bo Hu, Hong Kong (CN)

(73) Assignee: THE UNIVERSITY OF HONG KONG, Hong Kong (CN)

( * ) Notice: Subject to any disclaimer, the term of this patent is extended or adjusted under 35 U.S.C. 154(b) by 239 days.

(21) Appl. No.: 16/493,542

(22) PCT Filed: Mar. 12, 2018

(86) PCT No.: PCT/CN2018/078696
§ 371 (c)(1),
(2) Date: Sep. 12, 2019

(87) PCT Pub. No.: WO2018/166417
PCT Pub. Date: Sep. 20, 2018

(65) Prior Publication Data
US 2020/0001272 A1 Jan. 2, 2020

Related U.S. Application Data

(60) Provisional application No. 62/470,643, filed on Mar. 13, 2017.

(51) Int. Cl.
*B01J 20/08* (2006.01)
*B01J 20/32* (2006.01)
(Continued)

(52) U.S. Cl.
CPC ........... *B01J 20/3293* (2013.01); *B01J 20/08* (2013.01); *B01J 20/28007* (2013.01);
(Continued)

(58) Field of Classification Search
None
See application file for complete search history.

(56) References Cited

U.S. PATENT DOCUMENTS 7,297,290 B2 * 11/2007 Fuchs ................... B82Y 25/00
 252/62.52
2016/0052808 A1 * 2/2016 Huang ................... C02F 1/705
 210/757
2019/0142936 A1 * 5/2019 Cui ................... A61K 39/0005
 424/490

FOREIGN PATENT DOCUMENTS

CN 103143705 A 6/2013
CN 103606660 A 2/2014
(Continued)

OTHER PUBLICATIONS

Vilé, G., et al., "A stable single-site palladium catalyst for hydrogenations," Angewandte Chemie International Edition 54(38): 11265-11269 (2015).
(Continued)

*Primary Examiner* — Chester T Barry
(74) *Attorney, Agent, or Firm* — Leason Ellis LLP

(57) ABSTRACT

An insoluble thin hydroxide shell is synthesized on the surface of nanoscale zero-valent iron (NZVI), using a rate-controlled deprotonation method. The hydroxide coated NZVI remains suspended in aqueous phase better than the prior art and can be used to remove groundwater contaminants.

18 Claims, 10 Drawing Sheets

NZVI@Al(OH)$_3$_1.0 wt%

(51) Int. Cl.
| | |
|---|---|
| B01J 20/28 | (2006.01) |
| B01J 20/30 | (2006.01) |
| B22F 1/00 | (2006.01) |
| B22F 1/02 | (2006.01) |
| B22F 9/24 | (2006.01) |
| C02F 1/28 | (2006.01) |
| C02F 1/70 | (2006.01) |
| C02F 101/22 | (2006.01) |
| C02F 101/34 | (2006.01) |
| C02F 101/38 | (2006.01) |
| C02F 103/00 | (2006.01) |
| C02F 103/06 | (2006.01) |

(52) U.S. Cl.
CPC ... *B01J 20/28009* (2013.01); *B01J 20/28016* (2013.01); *B01J 20/3071* (2013.01); *B01J 20/3236* (2013.01); *B22F 1/0018* (2013.01); *B22F 1/02* (2013.01); *B22F 9/24* (2013.01); *C02F 1/281* (2013.01); *C02F 1/288* (2013.01); *C02F 1/705* (2013.01); *B22F 2301/35* (2013.01); *C02F 2101/22* (2013.01); *C02F 2101/345* (2013.01); *C02F 2101/38* (2013.01); *C02F 2103/007* (2013.01); *C02F 2103/06* (2013.01)

(56) References Cited

FOREIGN PATENT DOCUMENTS

| | | |
|---|---|---|
| CN | 104768641 A | 7/2015 |
| JP | 5670094 B2 | 2/2015 |

OTHER PUBLICATIONS

Kotaś, J. and Z. Stasicka, "Chromium occurrence in the environment and methods of its speciation," Environmental Pollution, 107(3): 263-283 (2000).

Zhao, X., et al., "Removal of fluoride from aqueous media by Fe3O4@Al(OH)3 magnetic nanoparticles," Journal of Hazardous Materials, 173(1-3): 102-109 (2010).

Nielsen, R. B. and J. Keasling, "Reductive dechlorination of chlorinated ethene DNAPLs by a culture enriched from contaminated groundwater," Biotechnology and bioengineering, 62(2): 160-165 (1999).

Gupta, V. K., et al., "A novel magnetic Fe@Au core-shell nanoparticles anchored graphene oxide recyclable nanocatalyst for the reduction of nitrophenol compounds," Water Research, 48(0): 210-217 (2014).

Ghosh Chaudhuri, R. and S. Paria, "Core/shell nanoparticles: classes, properties, synthesis mechanisms, characterization, and applications," Chemical Reviews, 112(4): 2373-2433 (2012).

Kolhatkar, A. G., et al., "Tuning the magnetic properties of nanoparticles," International Journal of Molecular Sciences, 14(8): 15977-16009 (2013).

Kosmulski, M.,, "pH-dependent surface charging and points of zero charge II. Update," Journal of Colloid and Interface Science, 275(1): 214-224 (2004).

Kosmulski, M., "pH-dependent surface charging and points of zero charge: III. Update," Journal of Colloid and Interface Science, 298(2): 730-741 (2006).

Yan, Y., et al., "Mechanism of myo-inositol hexakisphosphate sorption on amorphous aluminum hydroxide: spectroscopic evidence for rapid surface precipitation," Environmental Science & Technology, 48(12): 6735-6742 (2014).

Teagarden, D. L. and S. L. Hem, "Conversion of aluminum chlorohydrate to aluminum hydroxide," Journal of the Society of Cosmetic Chemists 33(6): 281-295 (1982).

Rengasamy, P. and J. Oades, "Interaction of monomeric and polymeric species of metal ions with clay surfaces. III. Aluminium (III) and chromium (III)," Soil Research 16(1): 53-66 (1978).

Sposito, G., The environmental chemistry of aluminum, CRC Press (1995).

Jiemvarangkul, P., et al., "Enhanced transport of polyelectrolyte stabilized nanoscale zero-valent iron (nZVI) in porous media," Chemical Engineering Journal, 170(2-3): 482-491(2011).

Mathieu, Y., et al., "Control of the morphology and particle size of boehmite nanoparticles synthesized under hydrothermal conditions," Langmuir, 23(18): 9435-9442 (2007).

Mu, Y., et al., "Insight into core-shell dependent anoxic Cr(VI) removal with Fe@Fe2O3 nanowires: indispensable role of surface bound Fe(II)," ACS Applied Materials & Interfaces, 7(3):1997-2005 (2015).

Baigorri, R., et al., "Supramolecular association induced by Fe(III) in low molecular weight sodium polyacrylate," Colloids and Surfaces A: Physicochemical and Engineering Aspects, 292(2): 212-216 (2007).

Korus, I. and Loska, K. "Removal of Cr(III) and Cr(VI) ions from aqueous solutions by means of polyelectrolyte-enhanced ultrafiltration," Desalination, 247(1): 390-395 (2009).

Lu, L., et al., "Synthesis and characterization of Fe—Fe2O3 core-shell nanowires and nanonecklaces," Crystal Growth & Design 7(2): 459-464 (2007).

Nurmi, J. T., et al., "Characterization and properties of metallic iron nanoparticles: spectroscopy, electrochemistry, and kinetics," Environmental Science & Technology, 39(5): 1221-1230 (2005).

Ai, Z., et al., "Core-shell structure dependent reactivity of Fe@Fe2O3 nanowires on aerobic degradation of 4-chlorophenol," Environmental Science & Technology, 47(10): 5344-5352 (2013).

Feng, Q., et al., "Investigation on the corrosion and oxidation resistance of Ni—Al2O3 nano-composite coatings prepared by sediment co-deposition," Surface and Coatings Technology, 202(17): 4137-4144 (2008).

Sherwood, P. M. A., "Introduction to studies of aluminum and its compounds by XPS," Surface Science Spectra, 5(1): 1-3 (1998).

Zou, Y., et al.. "Environmental remediation and application of nanoscale zero-valent iron and its composites for the removal of heavy metal ions: a review," Environmental Science & Technology, 50(14): 7290-7304. (2016).

Phenrat, T., et al., "Aggregation and sedimentation of aqueous nanoscale zerovalent iron dispersions," Environmental Science & Technology, 41(1): 284-290 (2006).

International Search Report and Written Opinion in corresponding PCT Application No. PCT/CN2018/078696, dated Jun. 5, 2018.

\* cited by examiner

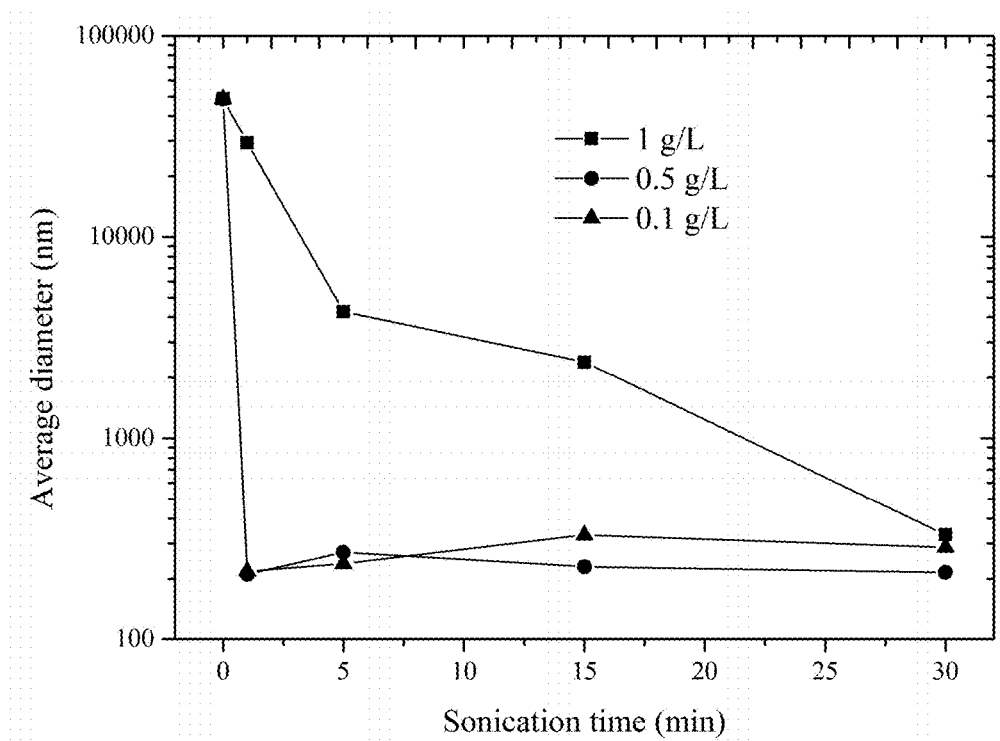
FIG. 1
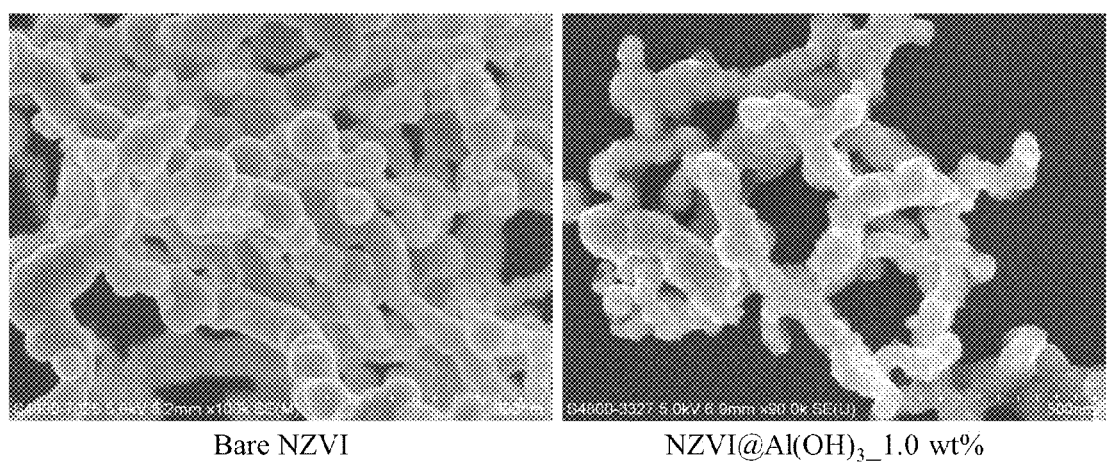
Bare NZVI
NZVI@Al(OH)$_3$_1.0 wt%
FIG. 2A
FIG. 2B

FIG. 3A
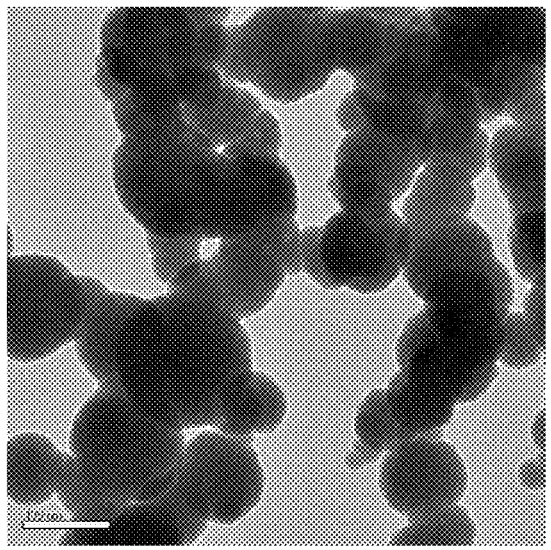
Bare NZVI
FIG. 3B
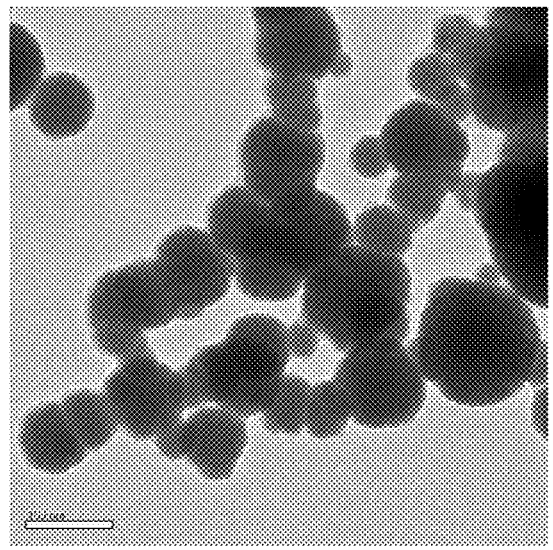
NZVI@Al(OH)$_3$_0.4 wt%
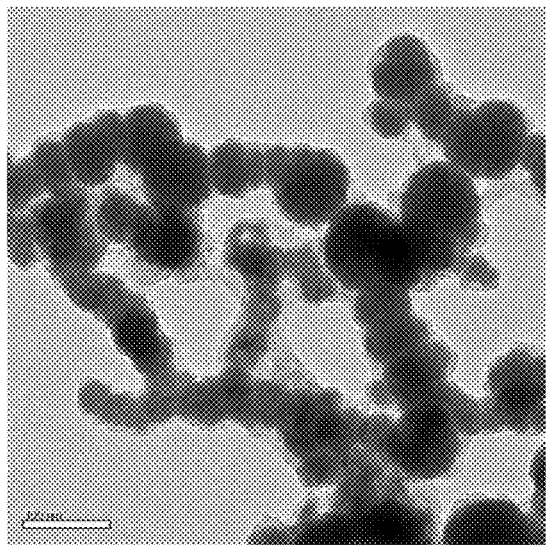
NZVI@Al(OH)$_3$_1.0 wt%
FIG. 3C
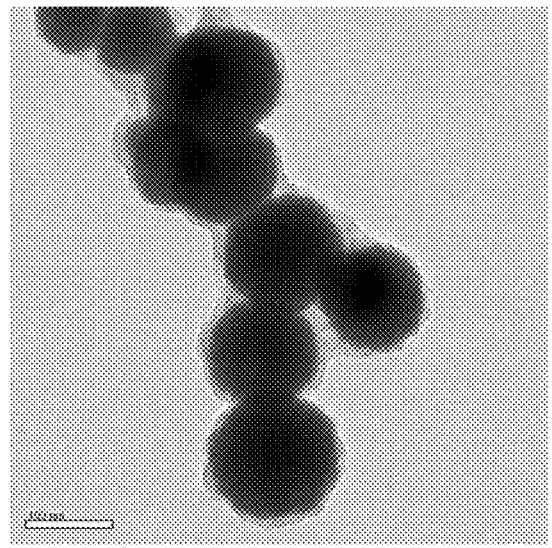
NZVI@Al(OH)$_3$_3.4 wt%
FIG. 3D

SYNTHESIS OF A THIN INSOLUBLE HYDROXIDE SHELL ON THE SURFACE OF MAGNETIC ZERO-VALENT METAL NANOPARTICLES FOR ENVIRONMENTAL REMEDIATION

FIELD OF THE INVENTION

The present invention relates to the modification of zero-valent metal nanoparticles, and particularly to the modification of nanoscale zero-valent iron for use in environmental remediation.

BACKGROUND OF THE INVENTION

Nanoparticles have been intensively studied and used because they have many specific functions in electronics, optics and environmental application. The aggregation of individual nanoparticles influences their long term performance during application. See, Vilé, G., et al., "A stable single-site palladium catalyst for hydrogenations," *Angewandte Chemie International Edition* 54(38): 11265-11269 (2015), which is incorporated herein by reference in its entirety. Magnetic nanoparticles, such as iron, nickel and cobalt, more readily aggregate together forming large chains and clusters.

Today, nanoscale zero-valent iron (NZVI), with high specific reactive surface area (10 to 100 $m^2/g$), has been widely used for in-situ remediation of groundwater contaminants. With the rapid growth of industrialization, numerous hazardous chemicals have been discharged into surface waters, groundwater and soil during the production, use and disposal processes. Heavy metal, chlorinated aliphatics and nitro-aromatics are groundwater contaminants that are widely distributed and of most concern. See, Kotaś, J. and Z. Stasicka, "Chromium occurrence in the environment and methods of its speciation," *Environmental Pollution*, 107(3): 263-283 (2000); Zhao, X., et al., "Removal of fluoride from aqueous media by $Fe_3O_4$@$Al(OH)_3$ magnetic nanoparticles," *Journal of Hazardous Materials*, 173(1-3): 102-109 (2010); Nielsen, R. B. and J. Keasling, "Reductive dechlorination of chlorinated ethene DNAPLs by a culture enriched from contaminated groundwater," *Biotechnology and bioengineering*, 62(2): 160-165 (1999); and Gupta, V. K., et al., "A novel magnetic Fe@Au core-shell nanoparticles anchored graphene oxide recyclable nanocatalyst for the reduction of nitrophenol compounds," *Water Research*, 48(0): 210-217 (2014), which are incorporated herein by reference in their entirety. Injection of a NZVI suspension into a subsurface aquifer forms a permeable reactive barrier that can effectively remove the hazardous contaminants in the groundwater through which it flows. NZVI interactions with various metals can be categorized as:

1. Reduction—Cr, As, Cu, U, Pb, Ni, Se, Co, Pd, Pt, Hg, Ag.
2. Adsorption—Cr, As, U, Pb, Ni, Se, Co, Cd, Zn, Ba.
3. Oxidation/re-oxidation—As, U, Se, Pb.
4. Co-precipitation—Cr, As, Ni, Se.
5. Precipitation—Cu, Pb, Cd, Co, Zn.

NZVI can be synthesized by a gas phase reduction method or a liquid phase reduction method to create NZVI with different particle size, surface area, degree of crystallinity, thickness and composition of the oxide shell. NZVI can also be modified by doping with different metal compounds or adding functional groups on the surface for different purposes.

Magnetic attraction between NZVI particles causes them to aggregate rapidly and form larger clusters in aqueous solution, which limits the environmental application on a large scale. The aggregation decreases the suspension stability of the NZVI particles and makes it hard for them to migrate through water-saturated porous media to the contaminated area during the injection process. Aggregation of NZVI particles also diminishes the reactive surface area and, therefore, decreases their reactivity towards contaminants.

Therefore, modification to prevent the aggregation and sedimentation of NZVI particles in aqueous phase is essential for its environmental application. Wide arrays of surfactants and polyelectrolytes have been used to stabilize NZVI in laboratory and field studies. Polymers in the solution and adsorbed on the NZVI surface introduced large amounts of negative charge, giving particles considerable electrostatic repulsion against aggregation. In addition to polymers, inorganic supporting materials, such as silica fume, Mg-aminoclay and pillared bentonite are added during the synthesis procedure of NZVI to form supported NZVI, with a considerable mass ratio of supporting materials to NZVI of around 3.5 to 7. The supporting materials effectively prevent the NZVI particles from aggregating and promote the mass transfer of contaminants from solution onto the particle surface. However, modification of NZVI with fine core-shell structure was rarely studied. Core-shell structures for nanoparticles are attracting more and more attention in many fields, such as electronics, biomedical, pharmaceutical, optics, and catalysis. See, Ghosh Chaudhuri, R. and S. Paria, "Core/shell nanoparticles: classes, properties, synthesis mechanisms, characterization, and applications," *Chemical Reviews*, 112(4): 2373-2433 (2012), which is incorporated herein by reference in its entirety. The properties of the nanoparticles can be quite different after they are coated with a thin shell. The properties can be modified by changing either the shell materials or the coating mass ratio. In addition, modifying NZVI with a thin and environmentally-benign shell can significantly reduce the mass injected together with NZVI into the environment, which is a promising approach for sustainable environment remediation.

SUMMARY OF THE INVENTION

The primary goal of the present invention is to develop a method of coating a thin, permeable and insoluble hydroxide shell on reactive nanoparticles, with homogeneous core-shell structures and limited coating doses, so as to enhance suspension stability and reactivity of the nanoparticles in aqueous solutions. The hydroxides can be aluminum hydroxide ($Al(OH)_3$). The reactive nanoparticles can be NZVI. Thus, $Al(OH)_3$ nanoparticles are synthesized on the surface of NZVI to form an $Al(OH)_3$ coated NZVI (NZVI@$Al(OH)_3$) product with a homogeneous core-shell structure.

The NZVI@$Al(OH)_3$ product according to the invention has higher application feasibility than that of NZVI for environmental remediation. $Al(OH)_3$ is used to modify NZVI so as to result in a permeable coating shell. Shell thickness control can be obtained by the synthesis method of the present invention. Coating with an $Al(OH)_3$ shell increases the surface charges and BET surface area of the NZVI particles, which enhances the suspension stability and reactivity of NZVI. The modification technic according to this invention requires limited chemical dosages, synthesis time and energy consumption, which makes it an environmentally friendly method.

An exemplary embodiment of the method of making core-shell product includes homogeneously coating $Al(OH)_3$ on the surface of NZVI particles by:

(a) dispersing NZVI using ultrasonic irradiation in an alcohol medium, preferably ethanol, with a NZVI concentration from 0.5 to 2 g/L under anaerobic conditions;

(b) adding aluminum ions into the NZVI dispersion with Al to Fe mass ratio from 2 to 10 wt %; and (c) gradually deprotonating aluminum ions by well controlling the adding rate of sodium hydroxide (NaOH) at from 1 to 3 mol-OH/mol-Al/min and total mole ratio of $OH^-$ to $Al^{3+}$ at 3. The thickness and permeability of the hydroxides shell can be controlled by doses of aluminum ions.

The $Al(OH)_3$ shell can effectively prevent aggregation and, therefore, increase the specific surface area of the nanoparticles after coating due to steric stabilization effects provided by the shell. In addition, the surface charge of the nanoparticles is enriched and the magnetic attraction force is reduced with increasing coating doses, which effectively enhance the suspension stability of the nanoparticles in the aqueous phase.

The $Al(OH)_3$ shell can promote the surface reaction of NZVI particles with dissolve contaminants. First, since the reactions of NZVI particles with contaminants are surface mediated, the reactivity of NZVI will be increased with increased specific surface area. Second, the adsorption of contaminants onto the surface of nanoparticles is promoted with the $Al(OH)_3$ coating shell. As the surface charges of the nanoparticles changes from negative to positive with the $Al(OH)_3$ shell, electrostatic attraction can effectively promote the mass transfer of negatively charged contaminants from the aqueous phase onto the particle surface. Third, the reaction products, i.e. ferrous ($Fe^{2+}$) and ferric ($Fe^{3+}$) ions, will readily precipitated on the surface of the bare NZVI particles, forming an iron (hydr)oxides shell that inhibits the mass transfer of contaminants from the aqueous phase to the NZVI surface, decreasing the reaction rates. With the $Al(OH)_3$ shell, the adsorption and precipitation of the iron ions on the particle surface will be inhibited by the positive charges on the surface of the $Al(OH)_3$, which preserves more reactive surface of the NZVI particles for contaminants remediation.

On the basis of the $Al(OH)_3$ shell structure, the NZVI surface can be further functionalized with polyelectrolytes to form polyelectrolyte/$Al(OH)_3$ hybrid coating shell. The polyelectrolytes can be polymers enriched with carboxylic acid groups. The polyelectrolyte/$Al(OH)_3$ shell can enrich the negative charges on the particle surface, due to the abundant carboxylic acid groups of polyelectrolytes, which will increase the electrostatic repulsion force between particles and enhance the suspension stability of NZVI particles in the aqueous phase. On the other hand, the surface carboxylic acid groups can act as a cross-linker to adsorb or concentrate cations on the particle surface via ion exchange. The function of cross-linking can be utilized to remove heavy metals from aqueous phase, such as $Cr^{3+}$, $Co^{2+}$ and $Ni^{2+}$ ions, and to concentrate reactive cations for surface reaction, such as $Fe^{2+}$ ions. What's more, during the reaction with NZVI in the aqueous phase, the surface polyelectrolytes with free carboxylic groups can cross-link reaction products, such as $Fe^{3+}$ ions, which will inhibit the formation of hydroxide precipitates and preserve more reactive sites on the particle surface.

In one embodiment, the present invention relates to a core-shell structured nanoparticle comprising a zero-valent metal nanoparticle core surrounded by a thin insoluble hydroxide shell.

In another embodiment, the present invention relates to the above mentioned core-shell structured nanoparticle, wherein the zero-valent metal nanoparticle core is a magnetic zero-valent metal nanoparticle.

In another embodiment, the present invention relates to the above mentioned core-shell structured nanoparticle, wherein the magnetic zero-valent metal nanoparticle is NZVI.

In another embodiment, the present invention relates to the above mentioned core-shell structured nanoparticle, wherein the insoluble hydroxide shell is $Al(OH)_3$.

In another embodiment, the present invention relates to the above mentioned core-shell structured nanoparticle, wherein the insoluble hydroxide shell contains $Al(OH)_3$ and polyelectrolyte.

In another embodiment, the present invention relates to the above mentioned core-shell structured nanoparticle, wherein the polyelectrolyte contains one or more than one of polymers enriched with carboxylic acid groups.

In another embodiment, the present invention relates to the above mentioned core-shell structured nanoparticle, wherein the polymers enriched with carboxylic acid groups are, but not limit to, polyacrylic acid (PAA), carboxymethyl cellulose (CMC) and polyvinyl alcohol-co-vinyl acetate-co-itaconic acid (PV3A).

In another embodiment, the present invention relates to the above mentioned core-shell structured nanoparticle, wherein the hydroxide shell has a thickness of 2-20 nm, preferably of 4-15 nm.

In another embodiment, the present invention relates to the above mentioned core-shell structured nanoparticle, wherein the particle size of the zero-valent metal nanoparticle core is in the range of from 20-150 nm, preferably 50-100 nm.

In another embodiment, the present invention relates to a method for synthesizing core-shell structured nanoparticles with a zero-valent metal nanoparticle core surrounded by a thin insoluble hydroxide shell, comprising the steps of:

dispersing zero-valent metal nanoparticles in an alcohol medium by ultrasonic irradiation;

adding metal ions as precursor into the nanoparticle suspension;

adding NaOH into the nanoparticle suspension with rate-control to deprotonate and precipitate metal ions; and washing the products with methanol and ethanol.

In another embodiment, the present invention relates to a method for synthesizing core-shell structured nanoparticles with a zero-valent metal nanoparticle core surrounded by a thin polyelectrolyte/hydroxide hybrid shell, comprising the steps of:

dispersing zero-valent metal nanoparticles in an alcohol medium by ultrasonic irradiation;

adding polyelectrolytes into the nanoparticle suspension;

adding metal ions as precursor into the nanoparticle suspension;

adding NaOH into the nanoparticle suspension with rate-control to deprotonate and precipitate metal ions; and washing the products with methanol and ethanol.

In another embodiment, the present invention relates to the above mentioned method for synthesizing core-shell structured nanoparticles, wherein the alcohol medium is ethanol.

In another embodiment, the present invention relates to the above mentioned method for synthesizing core-shell structured nanoparticles, wherein the metal ions precursor is anhydrous metal chloride.

In another embodiment, the present invention relates to the above mentioned method for synthesizing core-shell structured nanoparticles, wherein the atmosphere in which the steps are conducted is $N_2$ or Ar and the temperature is 22±1° C.

In another embodiment, the present invention relates to a method for preparing high suspended nanoparticles in an aqueous medium comprising the steps of:

adding the core-shell nanoparticles of claim 1 in an aqueous medium; and mixing by sonication for at least about 20 seconds.

In another embodiment, the present invention relates to a method for removing a contaminant from an aqueous medium comprising the step of: adding the core-shell nanoparticles as previously mentioned in a contaminated aqueous medium to achieve adsorption and reduction of the contaminants.

In another embodiment, the present invention relates to the method for removing a contaminant from an aqueous medium as mentioned above, wherein the contaminant comprises one of the group of nitro-containing organic compounds (4-nitrophenol, nitrobenzene), halogenated compounds ($CCl_4$, $C_2HCl_3$), heavy metals with high valent ($Cr_2O_7^{2-}$ and $AsO_4^{3-}$), non-metal anions ($NO_3^-$ and $SO_4^{2-}$) and heavy metal cations ($Cr^{3+}$, $Ni^{2+}$ and $Co^{2+}$).

In another embodiment, the present invention relates to the method for removing a contaminant from an aqueous medium as mentioned above, wherein the aqueous medium comprises one of the group of contaminated surface water, contaminated groundwater, municipal wastewater, industrial wastewater, effluent from a wastewater treatment plant, effluent from an industrial plant, leachate from a landfill site and leachate from a mining site.

BRIEF DESCRIPTION OF THE DRAWINGS

The foregoing and other objects and advantages of the present invention will become more apparent when considered in connection with the following detailed description and appended drawings in which like designations denote like elements in the various views, and wherein:

FIG. 1 is a graph showing the average diameter of bare NZVI particles as a function of time during ultrasonic irradiation in ethanol under anaerobic conditions with NZVI concentration of 0.1, 0.5 and 1 g/L;

FIG. 2A is a scanning electron microscope (SEM) images of bare NZVI and FIG. 2B is an SEM image of NZVI@Al(OH)$_3$ with 1.0 wt % Al(OH)$_3$ shell;

FIG. 3A is a transmission electron microscope (TEM) image of bare NZVI, FIG. 3B is a TEM image of NZVI@Al(OH)$_3$ with 0.4 wt % Al(OH)$_3$ shell, FIG. 3C is a TEM image of NZVI@Al(OH)$_3$ with a 1.0 wt % Al(OH)$_3$ shell and FIG. 3D is a TEM image of NZVI@Al(OH)$_3$ with a 3.4 wt % Al(OH)$_3$ shell;

DESCRIPTION OF EXEMPLARY EMBODIMENTS

Figure 4:
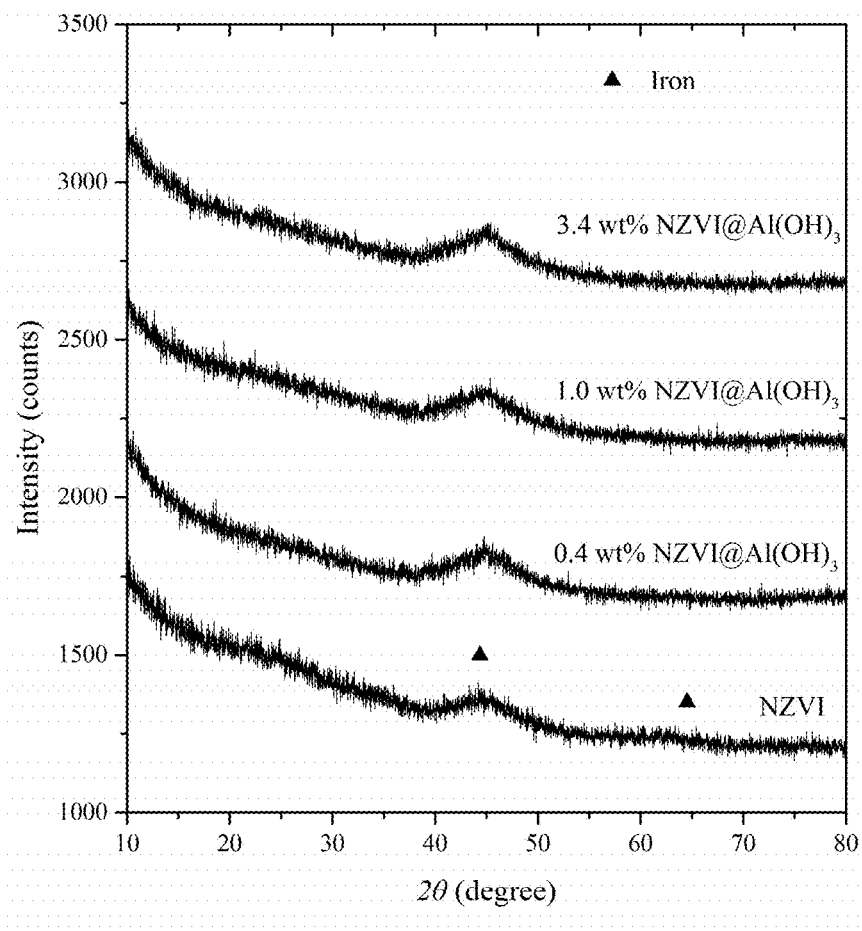
FIG. 4 shows XRD patterns of synthesized bare NZVI and NZVI@Al(OH)$_3$ with 0.4, 1.0 and 3.4 wt % Al(OH)$_3$ shell.

The modification technique of the present invention is for reactive metal nanoparticles that readily aggregate together to form large clusters in the form of dry powder or sediment in a liquid medium.

In one embodiment, the reactive metal nanoparticles are, or include, NZVI. NZVI, with magnetic attraction between particles, is typically a kind of nanoparticles that suffers from aggregation problems during its application.

In order to homogeneously coat a thin insoluble and permeable shell on the surface of nanoparticles, nanoparticles should be separated before coating and keep suspended during the coating process. Ultrasonic irradiation is applied as a precursor process for the coating process to break down NZVI particles into individual particles or small clusters in an alcohol medium, preferably ethanol. The ultrasonic process is preferably conducted under anaerobic conditions and room temperature to protect reactive content (Fe$^0$) of NZVI particles from oxidation.

Coating a non-magnetic shell on the surface of magnetic nanoparticles could weaken the magnetic attraction between particles, because the non-magnetic layer acts as a disordered spin layer at the surface of magnetic nanoparticles. The value of saturation magnetization, a characteristic of ferromagnetic and ferromagnetic materials, would decrease with the increasing thickness of the disordered spin layer as shown in Eq. 1.

$$Ms=Ms_b[(r-d)/r]^3 \quad (1)$$

where r is the radius of nanoparticles, d is the thickness of the disordered spin layer, and $Ms_b$ is the bulk Ms. See, Kolhatkar, A. G., et al., "Tuning the magnetic properties of nanoparticles," *International Journal of Molecular Sciences*, 14(8): 15977-16009 (2013), which is incorporated herein by reference in its entirety.

The non-magnetic shell is preferred to perform the function of an adsorbent. More preferably, the surface of the adsorbent is positively charged under most environmental conditions, i. e., pH values lower than 9. The positive surface can readily adsorb most toxic contaminants in the environment, which contaminants are negatively charged in aqueous phase.

In one embodiment, the non-magnetic adsorbent is, or includes, amorphous $Al(OH)_3$ nanoparticles. First, $Al(OH)_3$ nanoparticles are widely used as a cost-effective and environmentally-benign adsorbent to remove negative contaminants, such as phosphate, arsenate, hexavalent chromium, and fluoride ions from an aqueous environment. Second, with the zero point of charge from around 9 to 11.5, amorphous $Al(OH)_3$ nanoparticles are highly positively charged under neutral or weak acid (contaminated) conditions. See, Kosmulski, M., "pH-dependent surface charging and points of zero charge II. Update," *Journal of Colloid and Interface Science*, 275(1): 214-224 (2004); Kosmulski, M., "pH-dependent surface charging and points of zero charge: III. Update," *Journal of Colloid and Interface Science*, 298(2): 730-741 (2006); and Yan, Y., et al., "Mechanism of myo-inositol hexakisphosphate sorption on amorphous aluminum hydroxide: spectroscopic evidence for rapid surface precipitation," *Environmental Science & Technology*, 48(12): 6735-6742 (2014), which are incorporated herein by reference in their entirety. The positive charges on the surface can give nanoparticles electrostatic repulsion, i. e. electrostatic stabilization, to facilitate nanoparticles being separated and suspended in an aqueous environment. Last, since amorphous $Al(OH)_3$ nanoparticles have a polymer-like structure whose basic unit is a ring of six aluminums atoms in an octahedral configuration joined by double hydroxide bridges, steric stabilization (polymeric stabilization) may be provided by the polymer-like structure. See, Teagarden, D. L. and S. L. Hem, "Conversion of aluminum chlorohydrate to aluminum hydroxide," *Journal of the Society of Cosmetic Chemists* 33(6): 281-295 (1982), which is incorporated herein by reference in its entirety.

Amorphous $Al(OH)_3$ nanoparticles were usually synthesized, using $AlCl_3$, $Al_2(SO_4)_3$ or $Al(NO_3)_3$ as precursor, by adjusting the pH values of aqueous $Al^{3+}$ solutions at desired alkaline conditions. Then $Al^{3+}$ ions were gradually deprotonated and precipitated by gradually binding with $OH^-$ ions (Eq. 2), taking around 24 hours. The deprotonation process of $Al^{3+}$ ions is a polymerization process proceeding by hydroxyl bridging to give a chain-like structure. See, Rengasamy, P. and J. Oades, "Interaction of monomeric and polymeric species of metal ions with clay surfaces. III. Aluminium (III) and chromium (III)," *Soil Research* 16(1): 53-66 (1978), which is incorporated herein by reference in its entirety.

The present inventors developed a new method called "rate-controlled precipitation" or "rate-controlled deprotonation" to coat the $Al(OH)_3$ shell on the surface of NZVI particles. With this method, first $AlCl_3$ is dissolved in an alcohol medium, preferably ethanol, and added to the NZVI suspension. Part of the $Al^{3+}$ ions are adsorbed on the surface of the NZVI particles. The coating doses, i.e., mass ratio of Al to Fe, are adjust from 2 to 10 wt %. Second, NaOH dissolved in the same alcohol medium is gradually injected into the NZVI suspension via a syringe pump. The injection rate of NaOH is well controlled from 1 to 3 mol-OH/mol-Al/min. The total mole ratio of the injected OH to Al was controlled at 3. Last, pure alcohol, preferably methanol, is used to wash the products to remove any impurities.

$$Al^{3+} \rightarrow Al(OH)^{2+} \rightarrow Al(OH)_2^+ \rightarrow Al(OH)_3 \qquad (2)$$

Higher Al doses facilitated the adsorption of $Al^{3+}$ ions on the NZVI surface, increase the thickness of the $Al(OH)_3$ shell and decrease the permeability of the $Al(OH)_3$ shell for solutes in aqueous solution. The optimum coating dose of Al may be different for removal of different contaminants. During the process of NaOH injection, $Al^{3+}$ ions are deprotonated gradually to form poly-cations $Al(OH)_x^{(3-x)+}$ and, eventually, $Al(OH)_3$ nanoparticles precipitating on the surface of solid phase, i. e. the NZVI particles. The homogeneity of the $Al(OH)_3$ coating shell is influenced by the injection rate of NaOH.

The non-magnetic coating shell of the invention, preferably amorphous $Al(OH)_3$ nanoparticles, is used to prepare well suspended magnetic nanoparticles, preferably NZVI particles, in aqueous solutions, which can be used for removal of contaminants in reactors or can be injected into a subsurface aquifer for groundwater remediation. Suspension stability of the NZVI particles is influenced by magnetic attraction and repulsion forces. The repulsion forces could come from electrostatic repulsion and steric repulsion. The $Al(OH)_3$ shell increases the thickness of the disorder spin layer on the surface of the NZVI particles, hence the magnetic attraction among NZVI particles is weakened. The surface charges, i. e. electrostatic repulsion force of the NZVI particles can be enriched with the $Al(OH)_3$ coating shell and increased with increasing coating doses. In addition, increasing coating doses resulting in a thickened coating shell may provide steric block for stabilization.

The $Al(OH)_3$ coating shell is used to increase the reactivity of NZVI particles. First, as the NZVI particles are separated by ultrasonic irradiation and coated with a non-magnetic shell, the specific surface area of the NZVI particles is increased after the coating. Second, as the suspension stability of $Al(OH)_3$ in aqueous solutions is increased, the reactive surface is preserved for a longer time for the removal of contaminants. Third, as reactions with NZVI normally are facilitated with lower pH conditions and produce $OH^-$ ions, the $Al(OH)_3$ shell with AlOH groups on the surface can release $H^+$ ions (Eq. 3) to neutralize the produced $OH^-$ ions around the nanoparticles and keep the pH at relatively lower conditions. See, Sposito, G., *The environmental chemistry of aluminum*, CRC Press (1995), which is incorporated herein by reference in its entirety.

$$AlOH = AlO^- + H^+ \qquad (3)$$

The $Al(OH)_3$ coating shell is preferably used to increase the reaction rates of the NZVI particles with negatively charged contaminants. As the AlOH groups can bind $H^+$ ions and form a positively charged surface (Eq. 4), the mass transfer of contaminants with negative charges from an aqueous phase onto the surface of the nanoparticles, i. e. adsorption, is promoted. In a preferred embodiment, the negatively charged contaminants are nitro-contained organic compounds, such as 4-nitrophenol and nitrobenzene. In another embodiment, the negatively charged contaminants are heavy metals with a high valent, such as dichromate ($Cr_2O_7^{2-}$) and arsenate ($AsO_4^{3-}$). Another example of the negatively charged contaminants is a non-metallic anion, such as nitrate ($NO_3^-$), sulfate ($SO_4^{2-}$) and phosphate ($PO_4^{3-}$). In addition, the positively charged surface of the $Al(OH)_3$ coating shell can inhibit precipitations of $Fe^{2+}$ and Fe$^{3+}$ ions, which are reaction products of NZVI particles, on the particle surface. Compared to the Al(OH)$_3$ shell, the surface of bare NZVI.

particles are negatively charged, due to a thin iron oxide shell (~3 nm). The iron oxide shell is a more suitable surface for the adsorption and precipitation of Fe$^{2+}$ and Fe$^{3+}$ ions, which would significantly inhibit the effective contact of contaminants with the reactive surface of the NZVI particles and decrease the reaction rates.

$$AlOH + H^+ = AlOH_2^+ \quad (4)$$

In another embodiment, the surface of NZVI is further functionalized with polyelectrolytes on the basis of the Al(OH)$_3$ shell. The polyelectrolytes of the invention can be, or include, PAA. The molecule of PAA has numerous carboxylic acid groups on the polymer chains. PAA can be adsorbed on the surface of NZVI particles via anchoring between carboxylic acid groups and the iron (hydr)oxides surface of NZVI particles (—COO—Fe—O—). See Jiemvarangkul, P., et al., "Enhanced transport of polyelectrolyte stabilized nanoscale zero-valent iron (nZVI) in porous media," *Chemical Engineering Journal*, 170(2-3): 482-491 (2011), which is incorporated herein by reference in its entirety. On the other hand, PAA can cross-link the Al$^{3+}$ ions with the carboxylic acid groups (—COO—Al$^{2+}$), which has been utilized during the deprotonation process of Al$^{3+}$ to control the morphology of Al(OH)$_3$ nanoparticles. See Mathieu, Y., et al., "Control of the morphology and particle size of boehmite nanoparticles synthesized under hydrothermal conditions," *Langmuir*, 23(18): 9435-9442(2007), which is incorporated herein by reference in its entirety. Overall, with the anchoring and cross-linking behaviors, adding PAA during the coating process of Al(OH)$_3$ shell will benefit the immobilization of PAA and the precipitation of Al(OH)$_3$ nanoparticles on the NZVI surface.

The PAA/Al(OH)$_3$ hybrid shell coated on the NZVI surface is preferably used to increase the suspension stability and the reaction capacity of the NZVI particles. With the PAA/Al(OH)$_3$ coating shell, a part of carboxylic acid groups of PAA free from the anchoring or cross-linking can provide negative charges (—COO$^-$) near the particle surface to improve the ζ-potential of particles and, therefore, to improve the suspension stability of NZVI particles. On the other hand, the surface —COO$^-$ groups can crosslink Fe$^{2+}$ ions, which are produced from corrosion by H$^+$ ions and dissolved oxygen (DO) and reaction with contaminants. The surface cross-linked Fe$^{2+}$ ions can play an important role reducing contaminants, such as Cr$_2$O$_7^{2-}$. See Mu, Y., et al., "Insight into core-shell dependent anoxic Cr(VI) removal with Fe@Fe$_2$O$_3$ nanowires: indispensable role of surface bound Fe(II)," *ACS Applied Materials & Interfaces*, 7(3): 1997-2005(2015), which is incorporated herein by reference in its entirety. In addition, the cross-link function of the surface —COO$^-$ groups can inhibit the passivation of NZVI surface during reaction. Trivalent cations, such as Fe$^{3+}$ and Cr$^{3+}$, will be generated during the aerobic corrosion of NZVI and reduction of Cr$_2$O$_7^{2-}$ or other oxidative contaminants by NZVI. The trivalent cations, with low solubility in the aqueous phase, will precipitate as hydroxides quickly after generation on the NZVI surface and passivate the whole NZVI particles. In the presence of the surface —COO$^-$ groups of PAA, the generated cations (M$^{n+}$) will be cross-lined to form —COO-M$^{(n-1)+}$, which can significantly inhibit the precipitation of the cations. See Baigorri, R., et al., "Supramolecular association induced by Fe(III) in low molecular weight sodium polyacrylate," *Colloids and Surfaces A: Physicochemical and Engineering Aspects*, 292(2): 212-216(2007); Korus, I. and Loska, K. "Removal of Cr(III) and Cr(VI) ions from aqueous solutions by means of polyelectrolyte-enhanced ultrafiltration," *Desalination*, 247(1): 390-395(2009), which is incorporated herein by reference in its entirety.

EXAMPLES

Example 1

Coating Al(OH)$_3$ Shell on the Surface of Bare NZVI Particles

Synthesis of Bare NZVI

Bare NZVI particles used in this example were synthesized using a NaBH$_4$ reduction method reported by Lu with adjustments. See, Lu, L., et al., "Synthesis and characterization of Fe—Fe$_2$O$_3$ core-shell nanowires and nanonecklaces," *Crystal Growth & Design* 7(2): 459-464 (2007), which is incorporated herein by reference in its entirety. In particular, 0.1159 g of FeCl$_3$ was dissolved in 71.5 mL DI water in a 250 mL glass reactor. Then 50 mL of NaBH$_4$ aqueous solution (0.4 mol/L) was added into the FeCl$_3$ solution at a rate of 4.5 mL/min controlled by a peristaltic pump. The solution was next mixed with an overhead mechanical stirring device and the reactor was filled with pure N$_2$ gas during the reduction process. After a 10-minute reduction, NZVI particles were separated by a magnetic field and washed by DI water and ethanol, respectively, three times. Then the NZVI particles were washed with sonication in ethanol under N$_2$ atmosphere for three times for complete removal of any impurity.

Preparation of NZVI Suspension

In a 100 mL conical flask, 4, 20 and 40 mg NZVI particles were dissolved in 40 mL of absolute ethanol, obtaining NZVI concentrations of 0.1, 0.5 and 1 g/L, respectively. The conical flask was sealed with PTEE septa and the headspace was filled with pure N$_2$ gas. The conical flask was sonicated in a sonication tank with an ultrasonic frequency of 40 kHz and an output power density of 0.27 W/cm$^2$. The average size of the NZVI particles was monitored during the ultrasonic irradiation. FIG. 1 shows that the NZVI clusters initially have an average size of 48.7 μm in the form of sediment in the ethanol. After sonicating for 1 min, the NZVI clusters with concentrations of 0.1 and 0.5 g/L broke up into individual particles or small clusters with an average diameter of 210.7 nm. However, with NZVI concentration of 1 g/L, it took around 30 min for the average diameter of the NZVI particles to decrease to 332.0 nm. The results indicated that, with constant energy provided by the ultrasonic irradiation, the efficiency of the cluster break-up decreased with increasing NZVI concentrations. In terms of efficiency and cost-effectiveness, an NZVI concentration of 0.5 g/L is preferred for the coating process.

Synthesis of NZVI@Al(OH)$_3$

A stock solution of Al ions (1 g/L) was prepared by dissolving 0.494 g anhydrous AlCl$_3$ in 100 mL of absolute ethanol in a 120 mL glass bottle sealed with a rubber stopper and an aluminum flip-off cap. After sonicating the NZVI suspension (0.5 g/L) in the conical flask for 5 min, AlCl$_3$ stock solution was quickly injected into the conical flask. The Al dose (m$_{Al}$/m$_{Fe}$×100 wt %) was adjusted from 3 to 5 wt %. Then 3 mL of NaOH ethanol solution with desired concentrations (mol$_{OH}$/mol$_{Al}$=3.0) were introduced into the conical flask via a syringe pump with a delivery rate of 1 mol-OH/mol-Al/min. The ultrasonic irradiation was used to suspend NZVI particles and mix the solution throughout the coating process. In order to protect the NZVI particles from oxidation, the coating process was conducted under a $N_2$ atmosphere (200 mL/min) and 22° C. conditions. After injection of the NaOH solution, the solid phase, i.e. NZVI@Al(OH)$_3$ particles, were washed with ethanol and methanol and separated by a magnet. Synthesized NZVI@Al(OH)$_3$ particles were stored in ethanol to reduce oxidization and were washed with deoxygenated DI water before use.

Results and Discussion

FIG. 2A shows bare NZVI and FIG. 2B shows NZVI@Al(OH)$_3$ synthesized in this example. It can be seen from FIG. 2A that the bare NZVI was composed of 50-100 nm particles with smooth surface. As shown in FIG. 2B, after coating the NZVI with the Al(OH)$_3$ shell, the particles in the sample according to the present invention, were covered with a rough surface. TEM images showed that the bare NZVI particles were initially covered with a 3 nm layer (FIG. 3A), which is the iron oxide film formed by $Fe^0$ corrosion. See, Nurmi, J. T., et al., "Characterization and properties of metallic iron nanoparticles: spectroscopy, electrochemistry, and kinetics," *Environmental Science & Technology*, 39(5): 1221-1230 (2005), which is incorporated herein by reference in its entirety. Compared to bare NZVI particles, NZVI@Al(OH)$_3$ particles were additionally coated by a more transparent shell, which has a clear borderline with iron oxides layer. The more transparent shell was formed during the coating procedure and grew thicker with increasing Al doses of (Al$_{dose}$/Fe) from 3 to 5 wt %. According to TEM images, the thicknesses of the transparent shell are around 3.9, 4.3 and 6.7 nm with Al doses of 3, 4 and 5 wt %, respectively. Images at these weight percentages are shown in FIGS. 3B, 3C and 3D.

Table 1 (below) shows the physical and chemical properties of NZVI@Al(OH)$_3$ particles synthesized in this example. With Al doses of 3, 4 and 5 wt %, the Al deposition mass (Al$_{coat}$/Fe) were 0.4, 1.0 and 3.4 wt %, respectively. Accordingly, the recovery efficiency of (Al$_{coat}$/Al$_{dose}$) increased from 0.13 to 0.81, since the higher concentrations of Al$^{3+}$ and OH$^-$ facilitated the adsorption and precipitation on the NZVI surface. Accordingly with increasing Al(OH)$_3$ coating mass, the specific surface area of the particles enhanced gradually from 17.0 to 36.1 m$^2$/g, due the steric stabilization provided by the Al(OH)$_3$ shell inhibiting NZVI aggregation after the coating process. NZVI particles were initially negatively charged on the surface, due to the iron oxide shell, with a ζ-potential of −9.7. After coating with the Al(OH)$_3$ shell, the ζ-potential changed from negative to positive. The ζ-potential also increased, from 13.3 to 18.5, with increasing Al coating mass.

The XRD pattern of NZVI was dominated by a broad and weak peak of iron (FIG. 4), in agreement with weak crystallization nature of NZVI synthesized by the NaBH$_4$ reduction method. See, Ai, Z., et al., "Core-shell structure dependent reactivity of Fe@Fe$_2$O$_3$ nanowires on aerobic degradation of 4-chlorophenol," *Environmental Science & Technology*, 47(10): 5344-5352(2013), which is incorporated herein by reference in its entirety. This XRD pattern of NZVI did not change after coating with different Al doses. The Al(OH)$_3$ coated on the NZVI surface by the rate-controlled precipitation method at room temperature did not show any obvious crystallization feature with different Al doses. This amorphous nature of the Al(OH)$_3$ shell gives the shell defects and pores that allow solutes in aqueous solution to transport through the shell.

Figure 5A:
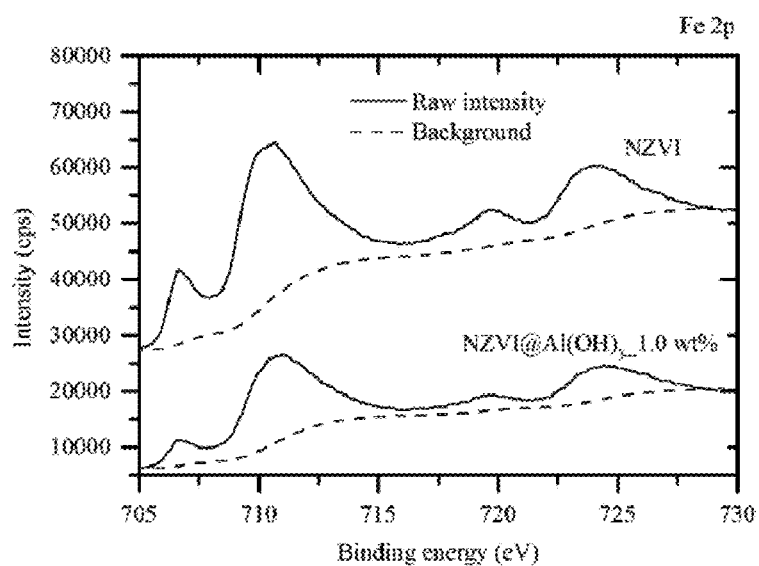
FIG. 5A shows X-ray photoelectron spectroscopy (XPS) of Fe 2p for bare NZVI and NZVI@Al(OH)$_3$ with 1.0 wt % Al(OH)$_3$ shell.
Figure 5B:
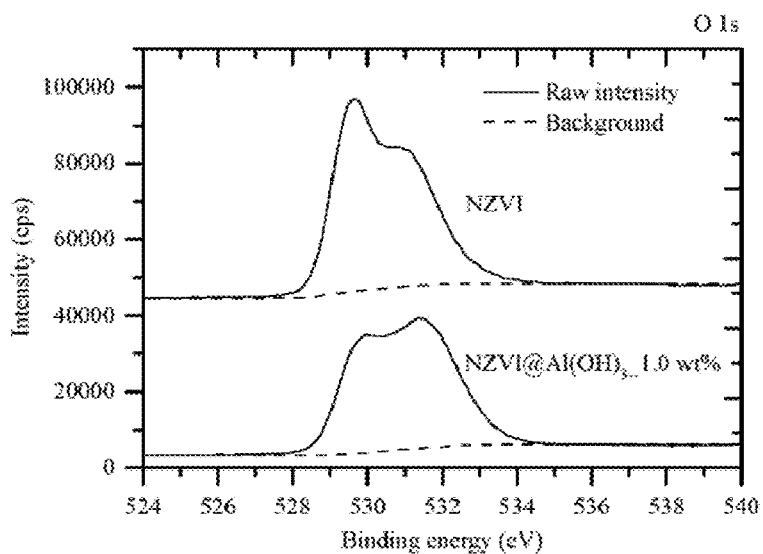
FIG. 5B shows an XPS of O 1s for bare NZVI and NZVI@Al(OH)$_3$ with 1.0 wt % Al(OH)$_3$ shell
Figure 5C:
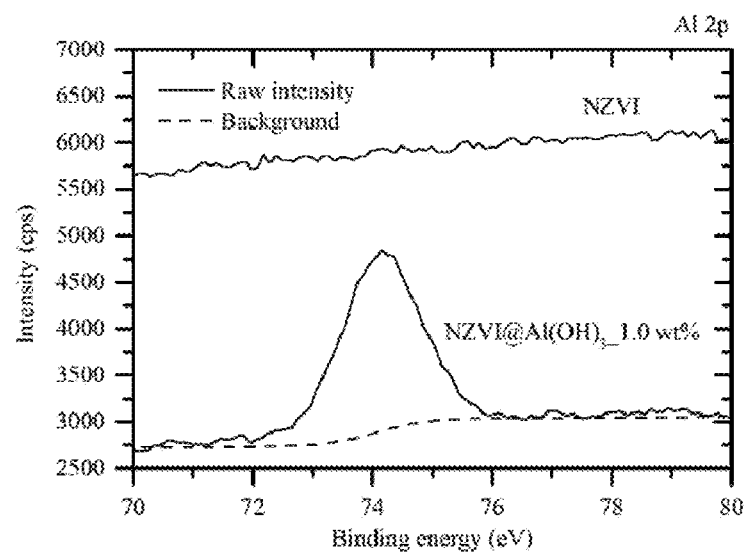
FIG. 5C is an XPS of Al 2p for bare NZVI and NZVI@Al(OH)$_3$ with 1.0 wt % Al(OH)$_3$ shell.

XPS analysis as shown in FIG. 5 was conducted to compare the surface composition of NZVI and NZVI@Al(OH)$_3$. XPS survey of NZVI and 1.0 wt % NZVI@Al(OH)$_3$ on Fe 2p showed the atomic concentration of iron on the surface decreased from 29.3% to 19.9% after coating. See FIG. 5A. Since the survey depth of XPS is around 5 nm, the decrease in surface concentration of iron shows that the NZVI particles were covered with an Al(OH)$_3$ shell so that photoelectrons escaping from the NZVI decreased. See, Feng, Q., et al., "Investigation on the corrosion and oxidation resistance of Ni—Al$_2$O$_3$ nano-composite coatings prepared by sediment co-deposition," *Surface and Coatings Technology*, 202(17): 4137-4144 (2008), which is incorporated herein by reference in its entirety. The XPS O 1s spectrum in FIG. 5B shows that the concentration of hydroxyl O increased from 53.2% to 70.1% after coating, which was due to the OH group bound with Al (OH—Al, centered at 531.5 eV formed on the surface. See, Sherwood, P. M. A., "Introduction to studies of aluminum and its compounds by XPS," *Surface Science Spectra*, 5(1): 1-3 (1998), which is incorporated herein by reference in its entirety. The valences of Al were also confirmed by XPS survey on Al 2p (FIG. 5C). Compared to bare NZVI, XPS Al 2p spectrum of NZVI@Al(OH)$_3$ shows a clear peak centered at 74.2 eV, which was assigned to the Al(III). See, Zou, Y., et al. "Environmental remediation and application of nanoscale zero-valent iron and its composites for the removal of heavy metal ions: a review," *Environmental Science & Technology*, 50(14): 7290-7304. (2016), which is incorporated herein by reference in its entirety.

TABLE 1

Physical and chemical properties of bare NZVI and Al(OH)$_3$ coated NZVI

| Materials | Bare NZVI | NZVI@Al(OH)$_3$ | | |
|---|---|---|---|---|
| AlCl$_3$ doses, (Al$_{dose}$/Fe, wt %) | 0 | 3 | 4 | 5 |
| Al(OH)$_3$ shell (Al$_{coat}$/Fe, wt %) | 0 | 0.4 | 1.0 | 3.4 |
| Shell thickness (nm) | 0 | 3.9 | 4.3 | 6.7 |
| Specific surface area (m$^2$/g) | 17.0 | 15.9 | 24.3 | 36.1 |
| ζ potential (mV) | −9.7 | 13.3 | 14.8 | 18.5 |

Example 2

Sedimentation Study

Sedimentation test were conducted to show the suspension stability of NZVI and NZVI@Al(OH)$_3$ particles in aqueous solutions. Suspensions of NZVI or NZVI@Al(OH)$_3$ containing NZVI of 0.1 g/L were filled in a 1-cm plastic cuvette. The optical absorbances (I$_t$) of the suspensions were monitored at 508 nm as a function of time using a UV-Vis spectrophotometer. A suspension volume of 2 mL was applied for the sedimentation tests, so that UV-Vis light could illuminate the top region of the suspension, which eliminated the influence of the sedimentation above the illuminated region. A 20-sec sonication was used to suspend NZVI particles in the aqueous solution before the test.

Results and Discussion

Figure 6:
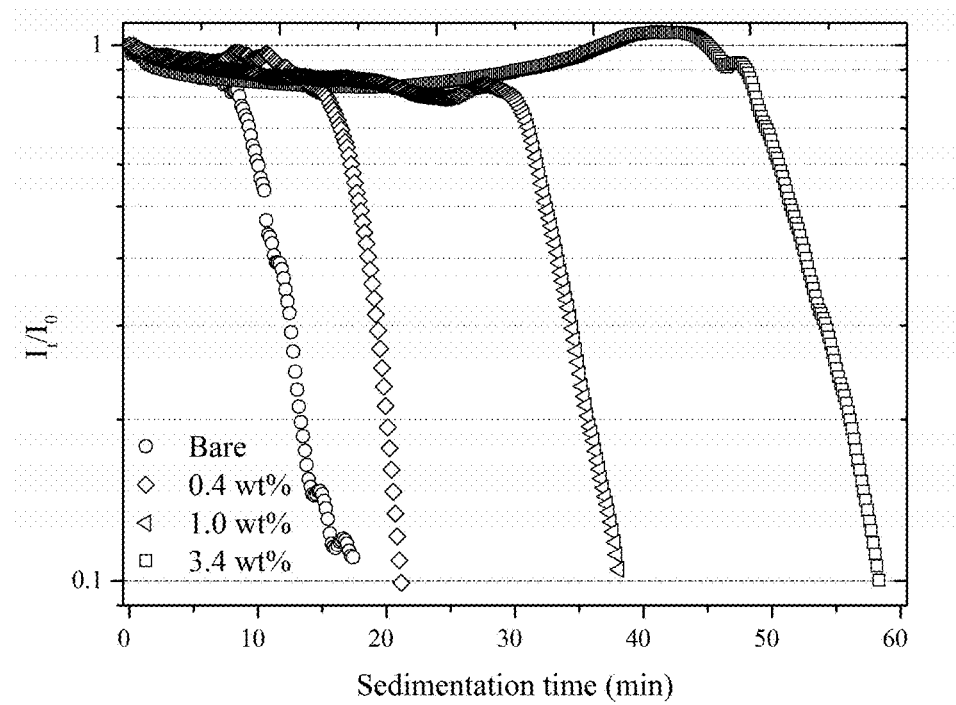
FIG. 6 shows sedimentation curves of bare NZVI and NZVI@Al(OH)$_3$ with 0.4, 1.0 and 3.4 wt % Al(OH)$_3$ shells in 1 mM NaHCO$_3$ solution, [NZVI]=0.1 g/L.

Sedimentation curves were obtained by plotting normalized absorbance (I$_t$/I$_0$) as a function of time (FIG. 6). I$_0$ is the initial absorbance of the suspensions, which were measured to be 1.2±0.15 for all suspensions of NZVI and NZVI@Al(OH)$_3$ containing 0.1 g/L NZVI. The decreases in I$_t$/I$_0$ indicated particles were settling down from the top region. Half time of the sedimentation (t$_{half}$, I$_t$/I$_0$=0.5) increased from 10.6 min to 51.6 min with Al/Fe doses from 0 to 3.4 wt %. Sedimentation of NZVI and NZVI@Al(OH)$_3$ followed the pattern discussed by Phenrat et al for sedimentation of NZVI particles. See, Phenrat, T., et al., "Aggregation and sedimentation of aqueous nanoscale zerovalent iron dispersions," *Environmental Science & Technology*, 41(1): 284-290 (2006), which is incorporated herein by reference in its entirety. A critical time ($t_{crit}$) segment divided the sedimentation curves into two portions. Before $t_{crit}$, NZVI particles gradually aggregated to discrete aggregates with a slow sedimentation velocity. When the NZVI aggregates linked with each other to form chains and clusters of critical size, i.e., at $t_{crit}$, the NZVI particles started to settle down rapidly. The two portions of the sedimentation curves were fitted by Eq. 5, describing the removal efficiency of particles in the illuminated region by sedimentation.

$$\frac{I_t}{I_0} = e^{-t/\tau} \quad (5)$$

where $\tau$ is the characteristic time (min) determined by hydrodynamic radius of tractal aggregates.

For the portion 1 of the sedimentation, $\tau_1$ of 3.4 wt % NZVI@Al(OH)$_3$ was 539.4 min, which is 8.7 times larger than $\tau_1$ of bare NZVI (55.8 min). Meanwhile, $\tau_2$ (for portion 2) only increased to 1.2 times with 3.4 wt % Al coating mass. The comparison of $\tau$ indicated that the effects of the Al(OH)$_3$ coating shell on NZVI sedimentation are mainly on particle aggregation before $t_{crit}$. The synthesized NZVI@Al(OH)$_3$, compared to NZVI, needed more time to form the critical-sized aggregates, i. e., the Al(OH)$_3$ shell inhibited the aggregation of NZVI particles in the aqueous solution. After forming the critical-sized aggregates, NZVI and NZVI@Al(OH)$_3$ particles have a similar sedimentation velocity.

Example 3

Reactivity Test—Anaerobic H$_2$ Production

Anaerobic H$_2$ generation, influenced by the aqueous pH values and BET surface area of nanoparticles, was conducted to compare the reactivity of NZVI and NZVI@Al(OH)$_3$ particles. In a glove box, 126 mL serum bottles were filled with 80 mL suspensions containing NZVI of 0.1 g/L and sealed with a rubber stopper and an aluminum flip-off cap. The headspace of the serum bottles was initially filled with pure N$_2$. Shaking at 200 rpm was applied during reaction and 50 µL of gas in the headspace was extracted at selected time points for H$_2$ concentration measurement by gas chromatography (GC9890).

Results and Discussion

Figure 7:
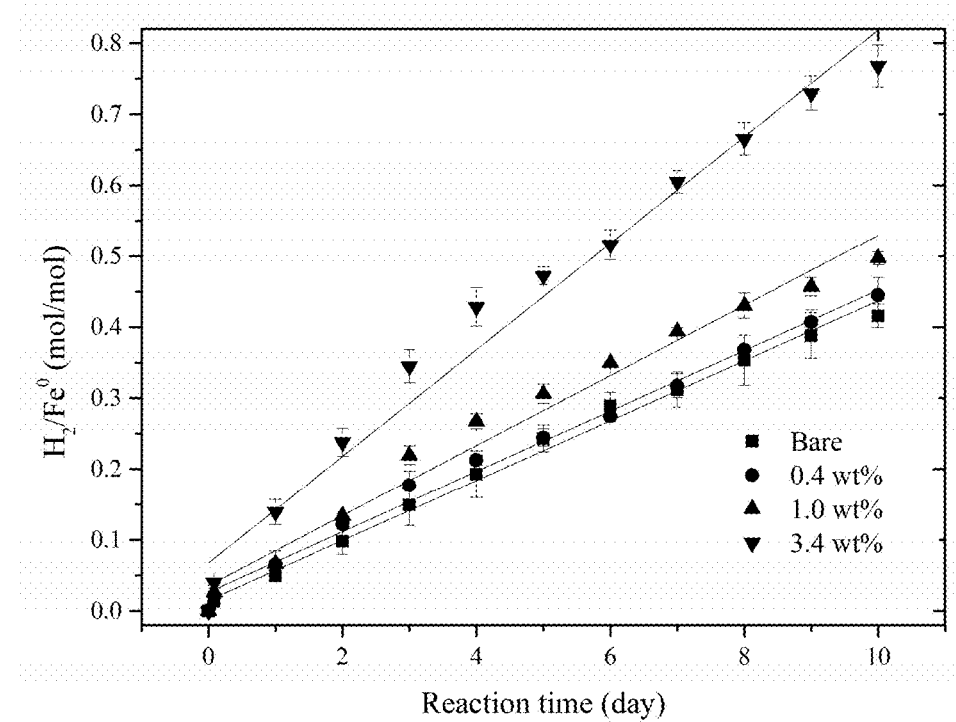
FIG. 7 shows the anaerobic $H_2$ generation of bare NZVI and NZVI@Al(OH)$_3$ in 1 mM NaHCO$_3$ solution, [NZVI] =0.1 g/L.

The results of anaerobic H$_2$ generation, normalized with an Fe$^0$ amount, in 10 days are presented in FIG. 7, which were simulated with pseudo zero-order kinetics (Eq. 6)

$$\frac{d[n_{H_2}]}{dt} = k_{obs,H_2} \cdot n_{Fe^0} \quad (6)$$

where $n_{H_2}$ is the mole of H$_2$ produced at time t (d), $n_{Fe^0}$ is the mole of Fe$^0$ involved for H$_2$ generation, $k_{obs,H_2}$ is the observed rate constant for H$_2$ generation (mol/mol-Fe$^0$/d).

The $k_{obs,H_2}$ increased from 0.0422 to 0.0751 mol/mol-Fe$^0$/d with Al doses from 0 to 3.4 wt %. The $k_{obs,H_2}$ was enhanced with the mass ratio of the Al(OH)$_3$ shell (TABLE 1). Due to the concentration of protons on the particle surface and increase in reactive surface area elevated by the Al(OH)$_3$ shell, the reactivity of NZVI@Al(OH)$_3$ particles are higher than that of bare NZVI particles.

Example 4

4-nitrophenol (4-NP) Removal

Adsorption of 4-NP by Iron Oxides and Al(OH)$_3$ Nanoparticles in Aqueous Solution Adsorption tests of selected contaminants with negative charges in aqueous solutions were conducted to show the adsorption ability of the surface of NZVI (iron oxides) and NZVI@Al(OH)$_3$ (Al(OH)$_3$) particles. The iron oxides were synthesized by aging bare NZVI in aerobic DI water for 24 hours at 23° C. and under continuous shaking at 200 rpm. The Al(OH)$_3$ coating shell was synthesized without bare NZVI using the same method of coating procedure for NZVI@Al(OH)$_3$ with an equivalent Al dose of 100 wt %. The synthesized iron oxides and Al(OH)$_3$ nanoparticles were determined to be 19.5 and 7.2 m$^2$/g, respectively. Ten mL 4-nitrophenol ("4-NP") solutions of 0.01, 0.02, 0.05 and 0.1 g/L co-dissolved with 1 mmol/L NaHCO$_3$ were used for adsorption tests. One mg iron oxide or Al(OH)$_3$ was added into the solutions to obtain 0.1 g/L solid phase. After the solid addition, the solutions were mixed by rotation at 40 rpm for 24 hr under 23° C. to reach the adsorption equilibrium. A 1 mL sample was filtrated through 0.45 µm membrane after the equilibrium to remove the solid phase and determine the 4-NP concentration in the aqueous phase ($C_e$).

Reduction of 4-NP in Aqueous Solution

Batch experiments of anaerobic 4-NP reduction were conducted with NZVI and NZVI@Al(OH)$_3$ particles. Vials of 43 mL were filled with 39.2 mL deoxygenated aqueous solution containing 0.1 g/L NZVI and 1 mmol/L NaHCO$_3$ and sealed with PTEE septa. Then a 0.8 mL 4-NP solution of 5 g/L was injected into the sealed vials. The initial pH value of the solution was 7.3. The vials were rotated on an end-over-end rotator at 60 rpm for complete mixing of the solutions. A one-mL dispersion was extracted each time and filtrated through the 0.45-µm membrane. The filtrate was diluted 10 times and the pH of the diluted sample was adjusted to around 10 for measurement of 4-NP concentration. Concentrations of 4-NP in aqueous phase were monitored by the UV-Vis adsorption spectra in the scanning range of 250-500 nm. Room temperature was controlled at 23° C. for all reactivity tests.

Results and Discussion

Figure 8:
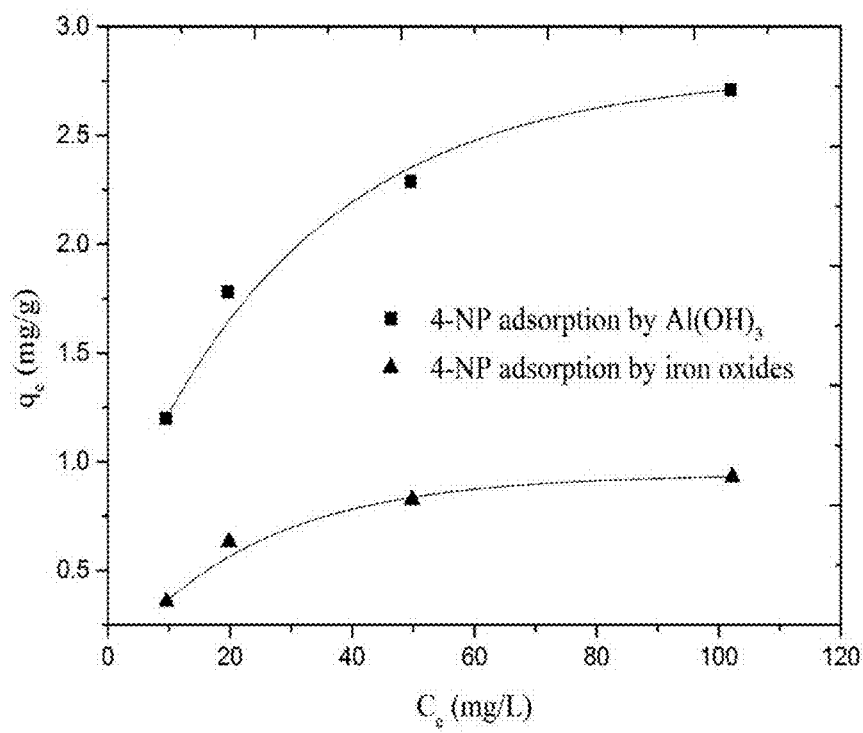
FIG. 8 is a graph showing the adsorption isotherm of 4-NP on synthesized iron oxides and Al(OH)$_3$ nanoparticles in aqueous solutions with solid concentrations of 0.1 g/L.

The adsorption process was analyzed by the Langmuir isotherm (Eq. 7):

$$\frac{1}{q_e} = \frac{1}{q_m K_L} \frac{1}{C_e} + \frac{1}{q_m} \quad (7)$$

where $q_e$ is the equilibrium adsorption capacity of 4-NP on solid phase (mg/g), $q_m$ is the maximum adsorption capacity (mg/g) and $K_L$ is the Langmuir adsorption constant (L/mg). The iron oxides on NZVI particles, composed of lepidocrocite and magnetite, showed an adsorption capacity of 0.026 mg/m$^2$, while the value for Al(OH)$_3$ coated nanoparticles was 0.423 mg/m$^2$ (FIG. 8). The considerable difference was due to the fact that surface charges dominate the adsorption behavior of the nanoparticles towards contaminants in aqueous solutions. Positive charges on the surface of Al(OH)$_3$ nanoparticles benefit the adsorption of 4-NP.

Figure 9:
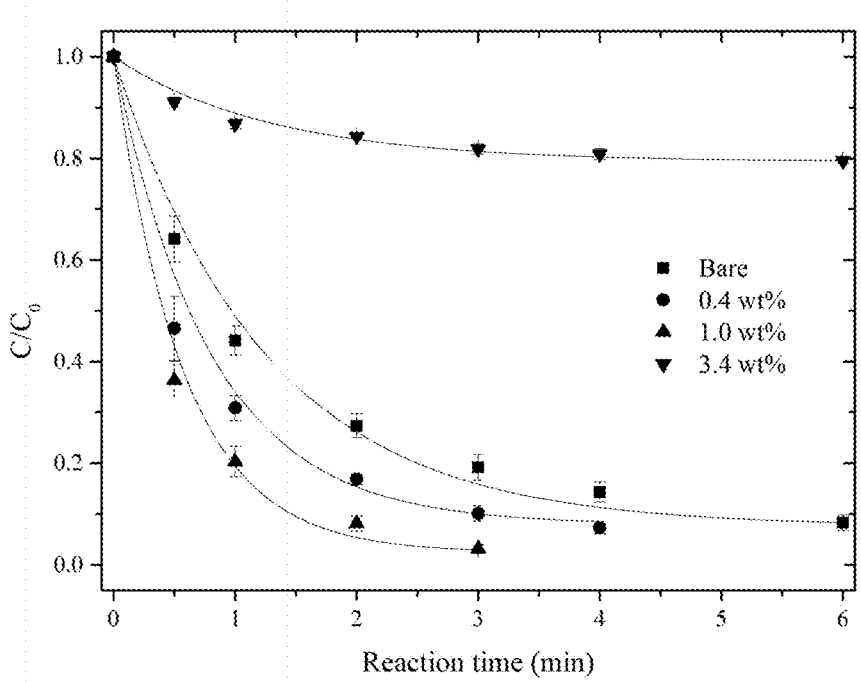
FIG. 9 is a graph showing the decontamination ability of bare NZVI and NZVI@Al(OH)$_3$ for reducing 4-NP in an anaerobic condition, [NZVI]=0.1 g/L, [4-NP]=0.1 g/L.

On the reactive surface of NZVI, 4-NP could be reduced to 4-aminophenol (4-AP), which has a lower toxicity. In the absence of the Al(OH)$_3$ shell, 91.7% of 0.1 g/L 4-NP was reduced by bare NZVI after 6 min, while 96.8% removal within 3 min was obtained by 1.0 wt % NZVI@Al(OH)$_3$. Reduction profiles are shown in FIG. 9 and could be fitted with a pseudo first-order kinetics (Eq. 8), $$\frac{d[4\text{-}NP]}{dt} = k_{obs,4\text{-}NP}[4\text{-}NP] \qquad (8)$$

where [4-NP] is the concentration (g/L) of 4-NP at time t (min), $k_{obs,4\text{-}NP}$ is the rate constant of 4-NP reduction (/mg-Fe$^0$/min).

Normalizing with Fe$^0$ mass involved in the reactions, the $k_{obs,4\text{-}NP}$ increased from 0.080 to 0.320/mg-Fe$^0$/min as the coating mass increased from 0 to 1.0 wt %. Undoubtedly, higher suspension stability and BET surface area of NZVI@Al(OH)$_3$, compare to bare NZVI, provide a more effective surface for reaction. However, increasing the Al(OH)$_3$ coating shell to 3.4 wt % decreased $k_{obs,4\text{-}NP}$ significantly to 0.0165/mg-Fe$^0$/min. The declined in reactivity may be due to the excessive Al(OH)$_3$ coating shell and decreased permeability of the shell, which inhibited the mass transfer of 4-NP through the Al(OH)$_3$ shell and contact with reactive surface of NZVI particles. Hence, an Al(OH)$_3$ coating shell of 1.0 wt % is optimum for 4-NP removal with NZVI@Al(OH)$_3$ particles.

Example 5

Longevity and Long-Term Reactivity of NZVI@Al(OH)$_3$

Figure 10:
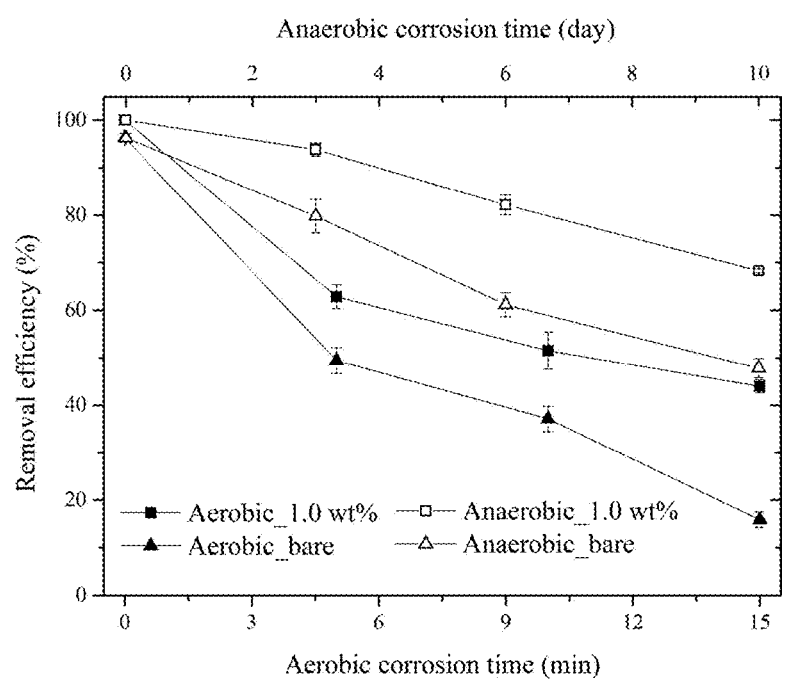
FIG. 10 is a graph showing the efficiency of 4-NP removal by bare NZVI and NZVI@Al(OH)$_3$ of 1.0 wt % coating mass before and after the aerobic and anaerobic corrosion (corrosion conditions: [NZVI]=0.1 g/L, [NaHCO$_3$]=1.0 mM, pH=8.3±0.1, T=23±1° C.)

As the aqueous corrosion limits the longevity and applicability of NZVI for full-scale environmental applications, modifications have been made to reduce the corrosion and extend the longevity of NZVI particles. In the present study, the effect of the Al(OH)$_3$ coating shell on the longevity of NZVI was investigated under both aerobic and anaerobic corrosion conditions. Under the aerobic condition, bare NZVI particles were quickly oxidized and the suspension turned to yellow after 5 min of aerobic corrosion. After a 15-min corrosion, the bare NZVI particles became brownish in the suspension. As shown by the following 4-NP reduction tests, the reactivity of bare NZVI decreased clearly with the time of aerobic corrosion, and the 4-NP removal efficiency decreased significantly from 96.3% to 15.9% (FIG. 10). On the contrary, the Al(OH)$_3$ coating shell could effectively hinder aerobic corrosion of NZVI particles. The suspension of NZVI@Al(OH)$_3$ at 1.0 wt % during the aerobic corrosion test appeared much less yellow than the bare NZVI suspension. The 4-NP removal efficiency with the corroded NZVI@Al(OH)$_3$ decreased to 44.0% of the original level (FIG. 10), which was considerably higher than that with the corroded bare NZVI.

The Al(OH)$_3$ coating shell was also able to protect the reactivity of NZVI particles under an anaerobic condition. The appearance of the bare NZVI and NZVI@Al(OH)$_3$ suspensions did not show obvious change after 10 day of corrosion in the anaerobic environment. However, the removal efficiency of 4-NP with bare NZVI decreased to 47.8% after the anaerobic corrosion (FIG. 10). In comparison, the 4-NP removal efficiency with NZVI@Al(OH)$_3$ after the anaerobic corrosion only decreased to 68.2%.

The extended longevity of NZVI@Al(OH)$_3$ is likely due to the shield effects provided by the Al(OH)$_3$ coating shell on the NZVI surface. As indicated by the results of H$_2$ generation, the surface area normalized rate constant of H$_2$ generation ($k_{sa, H2}$) decreased from 0.0247 to 0.0182 L/m$^2$/d. Therefore, the surface of NZVI@Al(OH)$_3$ was less accessible and hence less vulnerable than that of bare NZVI when exposed to competitive oxidants, such as H$^+$ ions and DO. Furthermore, the iron corrosion produced Fe$^{2+}$ (Eq. 9) and/or Fe$^{3+}$ ions (Eq. 10), which would precipitate on the NZVI surface (Eqs 11 & 12) and decrease the NZVI reactivity. Thus, the Al(OH)$_3$ coating shell could decrease the NZVI surface corrosion, leading to an extended longevity and long-term reactivity of NZVI.

$$2H_2O + Fe^0 \rightarrow Fe^{2+} + H_2\uparrow + 2OH^- \qquad (9)$$

$$4Fe^{2+} + O_2 + 2H_2O \rightarrow 4Fe^{3+} + 4OH^- \qquad (10)$$

$$Fe^{2+} + 2OH^- \rightarrow Fe(OH)_2\downarrow \qquad (11)$$

$$Fe^{3+} + 3OH^- \rightarrow Fe(OH)_3\downarrow \qquad (12)$$

The long-term leaching of Al ions was also assessed during the corrosion tests to evaluate the chemical stability of the Al(OH)$_3$ coating shell. Under different corrosion conditions, the concentration of dissolved Al ions varied from 0 to 10.3 µg/L for the pH range between 8.3 and 10.5. As the total Al content in the suspension of NZVI@Al(OH)$_3$ with 1.0 wt % coating shell was equivalent to 1.0 mg/L, less than 1% of Al would be released from the coating surface of NZVI@Al(OH)$_3$ after a long-term exposure in the aqueous environment.

Example 6

Coating PAA/Al(OH)$_3$ Hybrid Shell on the Surface of NZVI Particles

In the 40 mL NZVI suspension (0.5 g/L) prepared in Example 1, PAA powder of 10 mg was added before the coating process. Then the AlCl$_3$ stock solution was injected into the conical flask with the Al dose (m$_{Al}$/m$_{Fe}$×100 wt %) range from 1 to 3 wt %. Last, a 3 mL of NaOH ethanol solution with desired concentrations (mol$_{OH}$/mol$_{Al}$=3.0) were immediately introduced into the conical flask via the syringe pump with a delivery rate of 1 mol-OH/mol-Al/min. Other experimental conditions for the coating process of PAA/Al(OH)$_3$ coated NZVI (NZVI@PAA/Al(OH)$_3$) was the same as that of NZVI@Al(OH)$_3$.

Results and Discussion

Figures 11A, 11B:
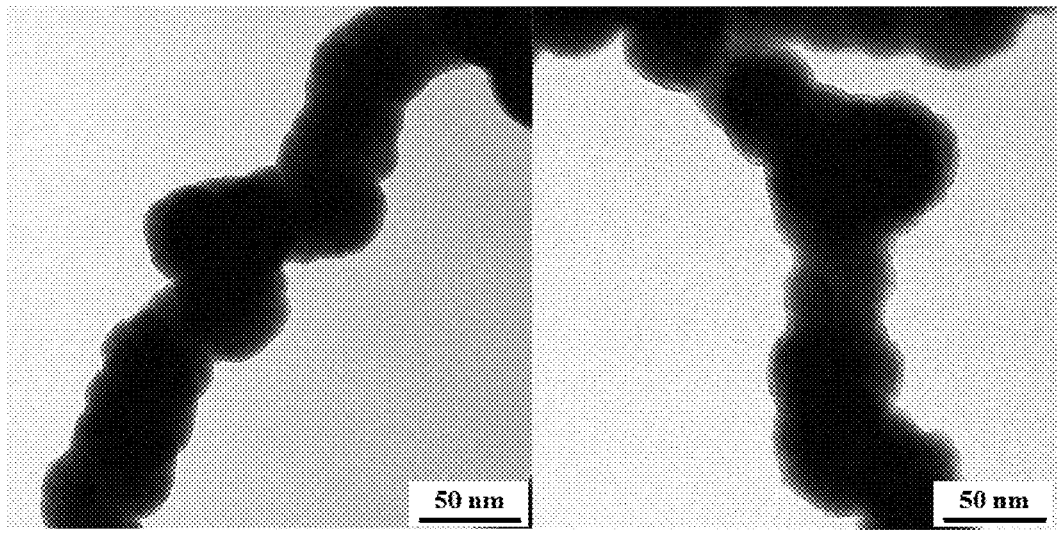
FIG. 11A is a TEM image of bare NZVI.
FIG. 11B is a TEM image of NZVI@PAA/Al(OH)$_3$ with 1 wt % Al/Fe coating dose.
Figures 11C, 11D:
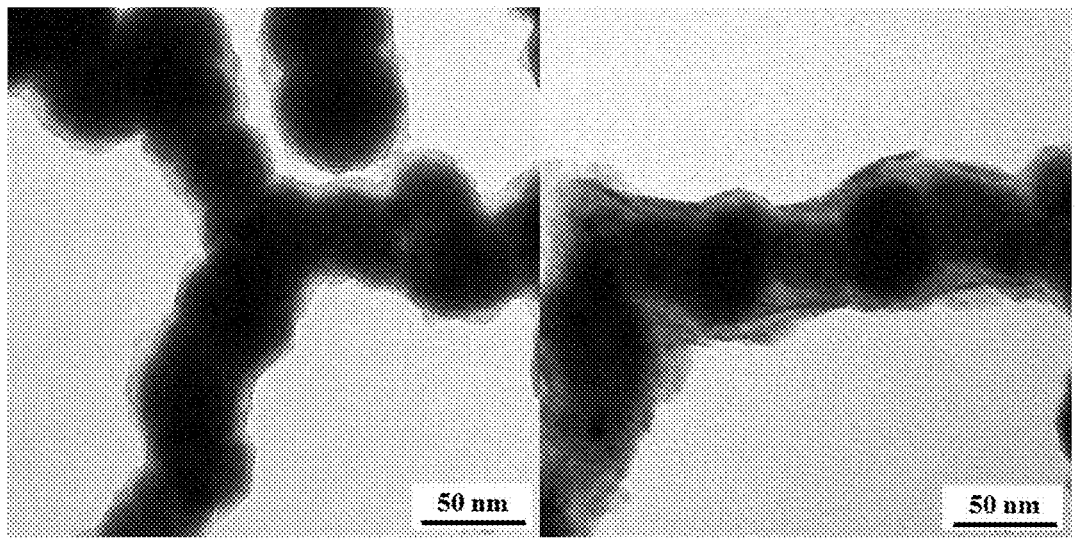
FIG. 11C is a TEM image of NZVI@PAA/Al (OH)$_3$ with 2 wt % Al/Fe coating dose and FIG. 11D is a TEM image of NZVI@PAA/Al(OH)$_3$ with 3 wt % Al/Fe coating dose.

FIG. 11 shows the TEM images of bare NZVI and NZVI@PAA/Al(OH)$_3$. Compared with bare NZVI (FIG. 11A), a clear shell homogeneously was formed on the surface of NZVI@PAA/Al(OH)$_3$ with a higher transparency compared to the NZVI core (FIG. 11B-11D). The thickness of the coating shell increased accordingly with the Al/Fe dose increased from 1 to 3 wt %. Coating the PAA/Al(OH)$_3$ shell on the NZVI surface increased the ζ-potential value from −9.7 to −22.5 and decreased the magnetism saturation value from 153.6 to 112.0 emu/g with the Al/Fe coating dose gradually increased to 3 wt %.

Figure 12A:
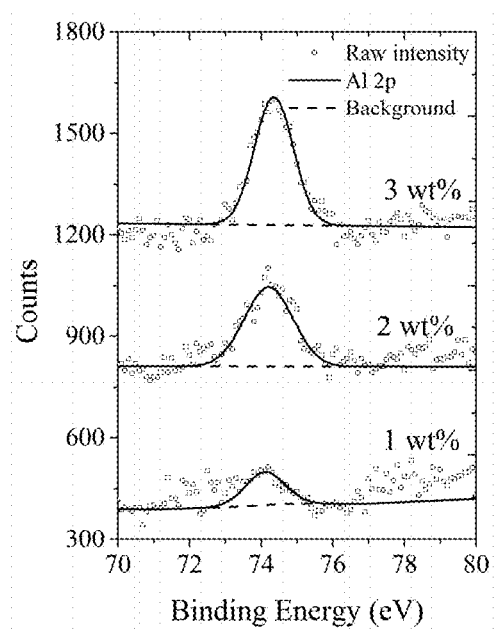
FIG. 12A shows XPS spectra of Al 2p for NZVI@PAA/Al(OH)$_3$ with 1, 2 and 3 wt % Al/Fe coating dose
Figure 12B:
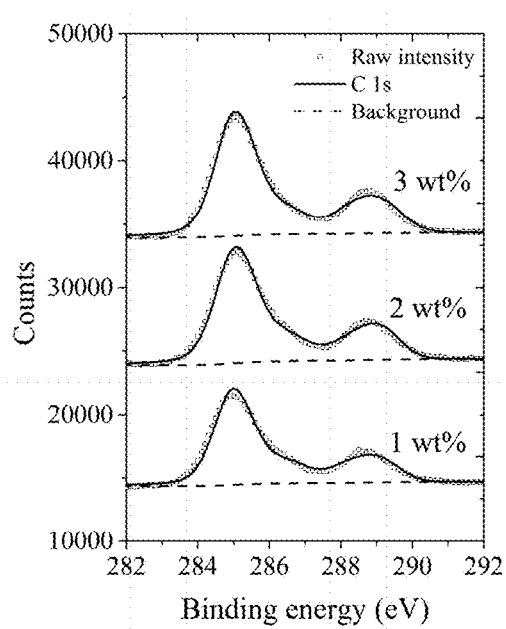
FIG. 12B shows XPS spectra of C 1s for NZVI@PAA/Al(OH)$_3$ with 1, 2 and 3 wt % Al/Fe coating dose.

The XPS spectra of Al 2p shows that the surface atomic concentration of Al(III) increased from 0.31% to 0.99% with the Al/Fe coating dose increased from 1 to 3 wt % (FIG. 12A). In the meantime, the surface concentration of C increased from 20.6% to 26.5% (FIG. 12B). With the increased Al/Fe coating doses, the relative abundance of carboxylate groups (—COO) to total C kept constant at around 22.4%.

Example 7

Hexavalent Chromium (Cr(VI)) Removal

Batch experiments on the reduction of Cr(VI) were conducted to study effects of the PAA/Al(OH)$_3$ shell on the reactivity NZVI particles. For a typical Cr(VI) reduction test, bare NZVI or NZVI@PAA/Al(OH)$_3$ particles and a 20 mL deoxygenated Cr(VI) solution were filled in a 23-mL glass reactor to obtain initial concentration of NZVI and Cr(VI) were 0.3 and 0.03 g/L, respectively. The reactor was sealed with a polytetrafluoroethylene septum and filled with N$_2$ gas in the headspace. During the reaction, the reactor was spun at 40 rpm at room temperature (23±1° C.). A one-mL dispersion sample was taken at predetermined time intervals and filtrated through the 0.45-μm membrane. The concentration of Cr(VI) in the filtrates was measured following the standard diphenylcarbazide method using the UV-Vis spectrophotometer at 540 nm. Effects of remediation scale, i.e. NZVI dose, on the Cr(VI) reduction were conducted by decreasing NZVI concentration to 0.2 and 0.1 g/L, respectively.

Results and Discussion

Figure 13:
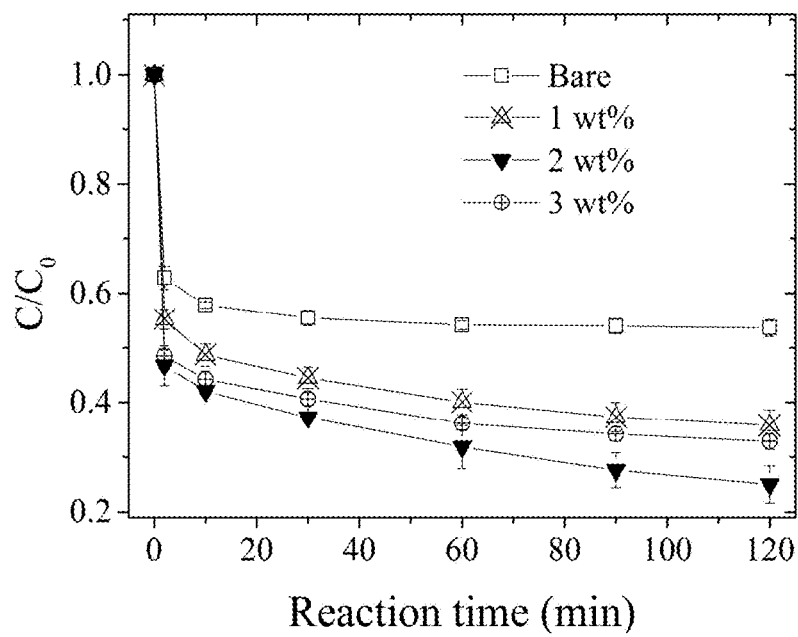
FIG. 13 shows the decontamination ability of bare NZVI and NZVI@PAA/Al(OH)$_3$ with different Al/Fe coating doses for reducing Cr(VI) in an anaerobic condition, [NZVI] =0.3 g/L, [Cr(VI)]=0.03 g/L.

The experimental results presented in FIG. 13 show that the PAA/Al(OH)$_3$ coating shell improved the Cr(VI) reduction efficiency by NZVI. With an optimum Al/Fe coating dose of 2 wt %, the residual Cr(VI) ratio (C/C$_0$) decreased from 0.54 to 0.25 after 120 min under the initial reaction conditions of 0.3 g/L NZVI and 0.03 g/L Cr(VI). After a 24-hr reaction, the C/C$_0$ with bare NZVI decreased slightly to 0.51, while it decreased to 0.07 with 2-wt % NZVI@PAA/Al(OH)$_3$.

Figure 14:
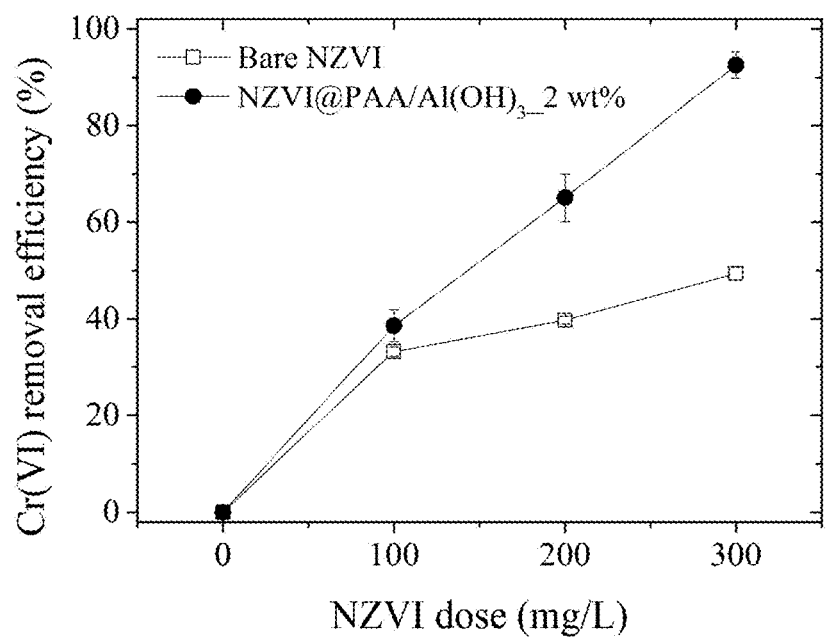
FIG. 14 shows the efficiency of Cr(VI) removal after 24 h by bare NZVI and NZVI@PAA/Al(OH)$_3$ of 1 wt % Al/Fe coating dose with different NZVI concentrations in an anaerobic corrosion, [Cr(VI)]=0.03 g/L.

Increasing the NZVI dose of bare NZVI from 0.1 to 0.3 g/L did not increase the Cr(VI) reduction proportionally, with the Cr(VI) removal efficiency only increasing from 33.3% to 49.4% after 24 hr (FIG. 14). NZVI@PAA/Al(OH)$_3$ of 2 wt % coating dose had a similar performance with bare NZVI on Cr(VI) reduction with the NZVI dose of 0.1 g/L. However, when the NZVI dose increased to 0.3 g/L, the Cr(VI) reduction efficiency of NZVI@PAA/Al(OH)$_3$ increased to 92.6%, which was much higher than that obtained with bare NZVI. As a result, the improvements on Cr(VI) reduction with the PAA/Al(OH)$_3$ coating shell increased with the increased NZVI doses. That is, the PAA/Al(OH)$_3$ coating shell can benefit the scale-up of application using NZVI techniques and keep performance stable for contaminants removal.

While the present invention has been particularly shown and described with reference to preferred embodiments thereof, it will be understood by those skilled in the art that various changes in form and details may be made therein without departing from the spirit and scope of the invention.

What is claimed is:

1. A core-shell structured nanoparticle comprising a zero-valent metal nanoparticle core surrounded by an insoluble, aluminum hydroxide shell having a thickness of 2-20 nm.

2. The core-shell structured nanoparticle of claim 1 wherein the zero-valent metal nanoparticle core is a magnetic zero-valent metal nanoparticle.

3. The core-shell structured nanoparticle of claim 2 wherein the magnetic zero-valent metal nanoparticle is nanoscale zero-valent iron (NZVI).

4. The core-shell structured nanoparticle of claim 1 wherein the insoluble aluminum hydroxide Al(OH)$_3$ further contains a polyelectrolyte.

5. The core-shell structured nanoparticle of claim 4 wherein the polyelectrolyte contains one or more than one of polymers enriched with carboxylic acid groups.

6. The core-shell structured nanoparticle of claim 5, wherein the polymers enriched with carboxylic acid groups are, but not limit to, polyacrylic acid (PAA), carboxymethyl cellulose (CMC) and polyvinyl alcohol-co-vinyl acetate-co-itaconic acid (PV3A).

7. The core-shell structured nanoparticle of claim 1, wherein the thin hydroxide shell has a thickness of 4-15 nm.

8. The core-shell structured nanoparticle of claim 1, wherein the particle size of the zero-valent metal nanoparticle core is in the range of from 20-150 nm.

9. A method for synthesizing core-shell structured nanoparticles of claim 1, comprising the steps of:
dispersing zero-valent metal nanoparticles in an alcohol medium by ultrasonic irradiation;
adding aluminum ions as precursor into the nanoparticle suspension;
adding NaOH into the nanoparticle suspension with rate-control to deprotonate and precipitate metal ions; and
washing the products with methanol and ethanol.

10. A method for synthesizing core-shell structured nanoparticles of claim 4, comprising the steps of:
dispersing zero-valent metal nanoparticles in an alcohol medium by ultrasonic irradiation;
adding polyelectrolytes into the nanoparticle suspension;
adding aluminum ions as precursor into the nanoparticle suspension;
adding NaOH into the nanoparticle suspension with rate-control to deprotonate and precipitate metal ions; and
washing the products with methanol and ethanol.

11. The method of synthesizing according to claim 9 wherein the alcohol medium is ethanol.

12. The method of synthesizing according to claim 9 wherein the aluminum ions precursor is anhydrous aluminum chloride.

13. The method of synthesizing according to claim 9 wherein the atmosphere in which the steps are conducted is N$_2$ or Ar and the temperature is 22±1° C.

14. A method for preparing nanoparticles suspended in an aqueous medium comprising the steps of:
adding the core-shell nanoparticles of claim 1 in an aqueous medium; and
mixing by sonication for at least about 20 seconds, wherein the nanoparticles remain suspended in the aqueous medium longer than uncoated particles.

15. A method for removing a contaminant from an aqueous medium comprising the step of:
adding the core-shell nanoparticles of claim 1 in a contaminated aqueous medium to achieve adsorption and reduction of the contaminants.

16. The method of claim 15 wherein the contaminant comprises one of the group of nitro-containing organic compounds (e.g., 4-nitrophenol, nitrobenzene), halogenated compounds (e.g., CCl$_4$, C$_2$HCl$_3$), heavy metals with high valent (e.g., Cr$_2$O$_7^{2-}$, AsO$_4^{3-}$), non-metal anions (e.g., NO$_3^-$ and SO$_4^{2-}$) and heavy metal cations (e.g., Cr$^{3+}$, Co$^{2+}$, Ni$^{2+}$).

17. The method of claim 15 wherein the aqueous medium comprises one of the group of contaminated surface water, contaminated groundwater, municipal wastewater, industrial wastewater, effluent from a wastewater treatment plant, effluent from an industrial plant, leachate from a landfill site and leachate from a mining site.

18. The core-shell structured nanoparticle of claim 1, wherein the particle size of the zero-valent metal nanoparticle core is in the range from 50-100 nm.

\* \* \* \* \*